United States Patent
Yao

(10) Patent No.: US 10,613,752 B2
(45) Date of Patent: Apr. 7, 2020

(54) DISPLAY METHOD OF ON-SCREEN KEYBOARD, AND COMPUTER PROGRAM PRODUCT AND NON-TRANSITORY COMPUTER READABLE MEDIUM OF ON-SCREEN KEYBOARD

(71) Applicant: Bing-Yang Yao, Taipei (TW)

(72) Inventor: Bing-Yang Yao, Taipei (TW)

( * ) Notice: Subject to any disclaimer, the term of this patent is extended or adjusted under 35 U.S.C. 154(b) by 0 days.

(21) Appl. No.: 15/581,687

(22) Filed: Apr. 28, 2017

(65) Prior Publication Data

US 2017/0315722 A1 Nov. 2, 2017

(30) Foreign Application Priority Data

Apr. 29, 2016 (TW) .............................. 105113618 A

(51) Int. Cl.
*G06F 3/0488* (2013.01)
*G06F 3/02* (2006.01)

(52) U.S. Cl.
CPC ............ *G06F 3/04886* (2013.01); *G06F 3/02* (2013.01); *G06F 3/0202* (2013.01); *H01H 2219/0026* (2013.01); *H01H 2219/028* (2013.01); *H01H 2225/028* (2013.01); *H01H 2239/006* (2013.01)

(58) Field of Classification Search
CPC ...... G06F 3/02; G06F 3/0237; G06F 3/04886; H01H 2219/0026; H01H 2219/028; H01H 2239/006; H01H 2225/028
See application file for complete search history.

(56) References Cited

U.S. PATENT DOCUMENTS

| | | | | |
|---|---|---|---|---|
| 5,396,430 A | * | 3/1995 | Arakawa | G01C 21/3667 340/990 |
| 5,748,177 A | * | 5/1998 | Baker | G06F 3/0237 340/4.1 |
| 6,611,253 B1 | * | 8/2003 | Cohen | G06F 3/0418 345/168 |
| 7,301,532 B1 | * | 11/2007 | Dobry | G06F 3/021 345/156 |
| 8,928,590 B1 | | 1/2015 | El Dokor | |

(Continued)

FOREIGN PATENT DOCUMENTS

| | | |
|---|---|---|
| CN | 102270115 B | 12/2011 |
| CN | 102280291 A | 12/2011 |
| CN | 102931966 A | 2/2013 |

OTHER PUBLICATIONS

Search Report of corresponding China Patent Application No. 201710174383.8 dated Aug. 29, 2019.

*Primary Examiner* — Kent W Chang
*Assistant Examiner* — Nathaniel P Brittingham

(57) ABSTRACT

A method for displaying an on-screen keyboard is applied a computing device connected to a physical keyboard and a screen, where the physical keyboard includes a plurality of keycaps capable of responding to a touch on the keycap to output a first key signal and responding to a keystroke on the keycap to output a second key signal to the computing device, and the method for displaying an on-screen keyboard includes: displaying an on-screen keyboard on a topmost layer of a display image of the screen; reading the first key signal output by the physical keyboard corresponding to the touch on the keycap; and displaying, according to the first key signal, a first key mark at a position corresponding to the touched keycap on the on-screen keyboard.

15 Claims, 29 Drawing Sheets

(56) References Cited

U.S. PATENT DOCUMENTS

| | | | | |
|---|---|---|---|---|
| 8,982,069 B2* | 3/2015 | Laubach | G06F 3/0213 | 345/173 |
| 9,760,241 B1* | 9/2017 | Lewbel | G06F 3/04812 | |
| 10,365,803 B2* | 7/2019 | Yao | G06F 3/0202 | |
| 2007/0008287 A1* | 1/2007 | Lin | G06F 3/018 | 345/168 |
| 2010/0164756 A1* | 7/2010 | Vanninen | G06F 3/0202 | 341/22 |
| 2010/0177035 A1* | 7/2010 | Schowengerdt | G06F 1/163 | 345/156 |
| 2010/0268924 A1* | 10/2010 | Fujii | G06F 9/4401 | 713/1 |
| 2011/0214053 A1* | 9/2011 | Scott | G06F 3/021 | 715/259 |
| 2012/0048702 A1* | 3/2012 | Liu | H01H 3/125 | 200/5 A |
| 2012/0210220 A1* | 8/2012 | Pendergast | G06F 3/0482 | 715/716 |
| 2012/0227006 A1* | 9/2012 | Amm | G06F 1/169 | 715/773 |
| 2012/0249587 A1 | 10/2012 | Anderson et al. | | |
| 2012/0327025 A1* | 12/2012 | Huska | G06F 3/016 | 345/174 |
| 2013/0214481 A1* | 8/2013 | Yamada | B65H 9/00 | 271/227 |
| 2014/0008196 A1* | 1/2014 | Martisauskas | H01H 13/702 | 200/5 A |
| 2014/0240234 A1* | 8/2014 | Bylander | G06F 3/04895 | 345/168 |
| 2014/0317574 A1* | 10/2014 | Xue | G06F 3/04815 | 715/852 |
| 2015/0058723 A1* | 2/2015 | Cieplinski | G06F 3/04855 | 715/702 |
| 2015/0067513 A1* | 3/2015 | Zambetti | G06F 3/0482 | 715/716 |
| 2017/0315621 A1* | 11/2017 | Yao | G06F 3/023 | |
| 2017/0315628 A1* | 11/2017 | Yao | G06F 3/0416 | |
| 2017/0315722 A1* | 11/2017 | Yao | G06F 3/02 | |

* cited by examiner

DISPLAY METHOD OF ON-SCREEN KEYBOARD, AND COMPUTER PROGRAM PRODUCT AND NON-TRANSITORY COMPUTER READABLE MEDIUM OF ON-SCREEN KEYBOARD

CROSS-REFERENCE TO RELATED APPLICATION

This non-provisional application claims priority under 35 U.S.C. § 119(a) to Patent Application No. 105113618 filed in Taiwan, R.O.C. on Apr. 29, 2016, the entire contents of which are hereby incorporated by reference.

BACKGROUND

Technical Field

The present invention relates to a data typing and display method of computing devices such as a computer, a mobile device, or a head-up display/head-mounted display/virtual reality display device, and in particular, to a method for displaying an on-screen keyboard, and a computer program product of the on-screen keyboard.

Related Art

An on-screen virtual keyboard, alternatively referred to as an on-screen keyboard (OSK for short). In Microsoft Windows operating systems, such as Windows 7, Windows 8, and Windows 10, enabling the small screen keyboard is that "a Win key+an X key" are simultaneously depressed, click on "execute", and then enter "osk"; alternatively, the "on-screen keyboard" is enabled in "start", "all programs", "accessories", and then "ease of access".

Although a physical keyboard may be replaced with the conventional on-screen keyboard to type data, unless a touch-screen on which keys may be clicked by using fingers is used, a data typing speed is extremely slow when keys are clicked one by one by using a mouse. The conventional on-screen keyboard is not suitable to be used in continuously typing a large amount of data. Usually, the conventional on-screen keyboard is used by a user at a last resort. For example, the physical keyboard cannot be normally used for typing due to a fault in a key, or the physical keyboard is an English keyboard, but a French character needs to be typed. Although the user can also enable the conventional on-screen keyboard and type data by using the physical keyboard, it does not make sense due to the conventional on-screen keyboard lacks of the feedback of "a finger standby position" of the user on the physical keyboard in real time. The conventional on-screen keyboard only has the feedback of keystrokes of the user on the physical keyboard in real time.

In prior art 1, the American Patent Application No. 2012/0249587 A1 (Inventor: Glen et al.) entitled "KEYBOARD AVATAR FOR HEADS UP DISPLAY (HUD)" discloses a head-up display (HUD) or a head-mounted display (HMD) used for viewing images, of an input device linked to a computer, representing fingers of a user. The HUD and the HMD capture images of the input device and user fingers by using a camera lens and display the images on the HUD and the HMD as shown in FIG. 3A, or after converting the images, the HUD and the HMD display representation images (a finger/hand image 602 and a keyboard image 603) on the HUD and the HMD, as shown in FIG. 3B.

In prior art 2, the U.S. Pat. No. 8,928,590 B1 (inventor: Tarek) entitled "GESTURE KEYBOARD METHOD AND APPARATUS" discloses a keyboard capable of capturing operation gestures. The keyboard captures operation gestures of a user within a gesture operation range (that is, a visible range of camera lenses) by using a pair of camera lenses disposed on the keyboard, and is capable of interacting with a system after the gestures are recognized.

None of the prior arts used the on-screen keyboard technology nor improved it. In the prior art 1, a real image or a converted representation image is displayed on a head-up display/head-mounted display. If image processing of a semi-transparency effect is performed on the real image, the distortion is dramatically increased, probably resulting in that a finger position in the image is not easy to be recognized. But if the image processing of the semi-transparency effect is not performed on the real image, the real image occupies large space of a visible display area (the real image will completely block the lower overlap screen). Even if the converted representation image may be displayed in the semi-transparency effect, a finger representation image 602 still occupies too much visible display area and is easy to distract attention of a user. Moreover, user would feel strange or unexpected if the virtual images (virtual reality images or game images) and the real images (real keyboard images) are mixed together on the display screen. More importantly, real-time image processing needs to consume a large quantity of hardware resources and easily affects performance of the system. In the prior art 2, the gesture operation range is approximately 4 inches above the keyboard, and the gesture operations have no connection with the keys on the physical keyboard, thus cannot be combined with the on-screen keyboard technology, cannot accelerate a speed of data typing of a user by using the physical keyboard, and cannot assist the user in training of touch-typing (typing without staring at the keyboard). In addition, the camera lenses of prior arts may misjudge a finger position, but the prior arts lack of a method for correcting the misjudgment. Besides, when ambient light sources are insufficient, the camera lenses of prior arts may not able to capture the image. Therefore, it is necessary to provide an improved on-screen keyboard technology, which provides the feedback of keystrokes in real time, the feedback of "a finger standby position" of a user on a physical keyboard in real time, and avoid the problem that the camera lenses misjudge the finger standby position, and resolve the problem that when ambient light sources are insufficient, the camera lenses cannot capture the image, so that the improved on-screen keyboard technology must be an edge tool for practicing touch-typing. In addition, when applied to a head-up display/head-mounted display/virtual reality display device, the improved on-screen keyboard technology also resolves the problem that a user cannot stare at the physical keyboard, assists users who are not adept at touch-typing in typing data by using the physical keyboard, and displays the typed data on the screen/head-up display/head-mounted display/virtual reality display device.

SUMMARY

In view of this, the present invention provides a method for displaying an on-screen keyboard, and a computer program product and a non-transitory computer readable medium of the on-screen keyboard, to display both keystroke information and information of finger standby positions by using an improved on-screen keyboard, so that a user only needs to focus his sight on the on-screen keyboard of an apparatus (such as the screen of a computer/mobile device/virtual reality display device), without staring at a physical keyboard, thereby accelerating a data typing speed.

An embodiment of the present invention provides a method for displaying an on-screen keyboard, applied to a computing device connected to a physical keyboard and a screen, where the physical keyboard includes a plurality of keycaps capable of responding to a touch on the keycap to output a first key signal and responding to a keystroke on the keycap to output a second key signal to the computing device, and the method for displaying an on-screen keyboard includes: displaying an on-screen keyboard on a topmost layer of a display image of the screen; reading the first key signal output by the physical keyboard corresponding to the touch on the keycap; and displaying, according to the first key signal, a first key mark at a position corresponding to the touched keycaps on the on-screen keyboard.

The present invention also provides a computer program product comprising a plurality of computer executable instructions stored in a non-transitory computer readable medium. The computer executable instructions are loaded and executed by the computing device to cause the computing device to complete the above-described method for displaying an on-screen keyboard.

The present invention further provides a non-transitory computer readable medium storing a computer program, where the computer program includes a plurality of computer executable instructions for executing the above-described method for displaying an on-screen keyboard.

The following implementation manners describe features and advantages of the present invention in detail. The content enables any person skilled in the art to know technical content of the present invention and implement the technical content. A person skilled in the art can easily understand the objectives and advantages of the present invention according to the content, the application scope, and drawings disclosed in this specification.

DETAILED DESCRIPTION

The present invention is applied to, but is not limited to, computing devices such as a personal computer (PC/Mac), a notebook computer (Laptop/Portable Computer), a smart-phone, a tablet computer, a smart television, a head-up display device, a head-mounted display device, a virtual reality display device, and a video game console (or TV Game Console), which are in communication connection with a physical keyboard 18 and screens 76a, 76b, and 76c. A manner for the communication connection may be a wireless communication manner or a wired communication manner. The physical keyboard 18 and the screens 76a, 76b, and 76c may be disposed outside the computing device and connected to the computing device, or may be disposed as a part of the computing device.

Accompanying drawings of this specification are used to describe functions and technical features of the present invention, but are not intended to limit appearance of the present invention. Multiple embodiments of the physical keyboard 18 and multiple embodiments of the on-screen keyboards 68a, 68b, 68c, and 68d are separately described below. The physical keyboard 18 in the different embodiments may be arbitrarily cooperated with the on-screen keyboards 68a, 68b, 68c, and 68d in the different embodiments.

Figure 1:
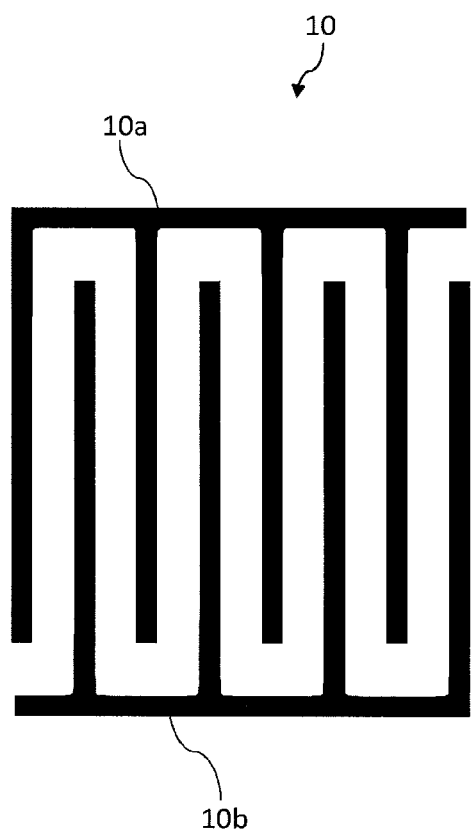
FIG. 1 is a schematic diagram of distribution of a touch key part of a physical keyboard according to an embodiment of the present invention.

Referring to FIG. 1, FIG. 1 is a schematic diagram of distribution of a touch key part 10 of a physical keyboard 18 according to an embodiment of the present invention. A touch key part 10 is combined by a first detection electrode 10a and a second detection electrode 10b. The first detection electrode 10a and the second detection electrode 10b which are neighboring and non-conductive to each other to form a coupling capacitor. In an embodiment, the first detection electrode 10a and the second detection electrode 10b are fork-shaped and interlaced with each other. The touch key part 10 is made from a highly conductive material. The touch key part 10 is located at an upper outer surface (that is, a contact surface capable of being touched by fingers) of a keycap 12a. For convenience of description and identification, the first detection electrode 10a and the second detection electrode 10b are presented in black bold lines herein, but a color of the touch key part 10 is not limited in the present invention. In some embodiments, the touch key part 10 is made from a material of a highly conductive polymer. A dye of any color may be added in a manufacturing process, so that the manufactured touch key part 10 and the keycaps 12a are of the same color and look like a one-piece component in appearance and are relatively artistic. Alternatively, colors of a high contrast ratio may be selected to respectively manufacture the touch key part 10 and the keycap 12a, so that the touch key part 10 has an eye-attracting visual effect. In addition, appearance of the touch key part 10 is not limited in the present invention to being square as the figure shows. In some embodiments, appearance of the touch key part 10 may also be ring-shaped (which is commonly seen in keys of a conventional touch control electronic apparatus and is not shown in the figure).

Figure 2:
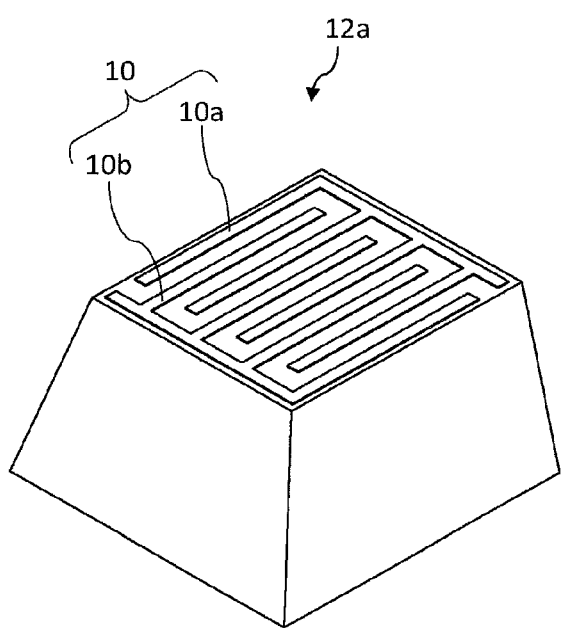
FIG. 2 is an axonometric view of a keycap of a physical keyboard according to a first embodiment of the present invention.

Referring to FIG. 2, FIG. 2 is an axonometric view of a keycap 12a of a physical keyboard 18 according to a first embodiment of the present invention. The touch key part 10 on the keycap 12a of the first embodiment is presented in an embossed manner, but it is not limited that the touch key part 10 should be higher than the surface of the keycap 12a. In some embodiments, the upper outer surface of the keycap 12a is a flat surface (that is, the touch key part 10 is internally embedded into the keycap 12a, so that the touch key part 10 and plastic of the keycap 12a in a gap is of the same height), so that a user cannot feel a difference in a sense of finger touch. For convenience of description, a mark representing each of the keycaps 12a is omitted in the figure, but this is not intended to limit a printed mark of the keycap 12a of the present invention. Actually, the printed mark on the keycap 12a, unless the keycap 12a uses any ablation and etching method, does not affect normal operations of the touch key part 10.

Figure 3:
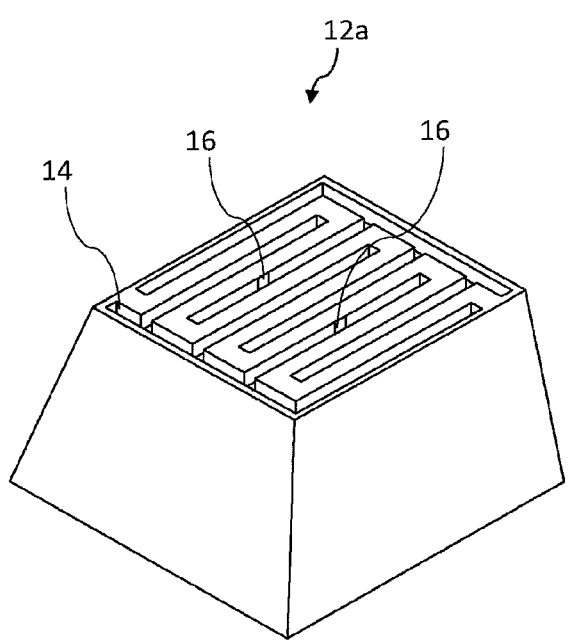
FIG. 3 is an axonometric view of a preserved groove of the keycap of the physical keyboard according to the first embodiment of the present invention.
Figure 4:
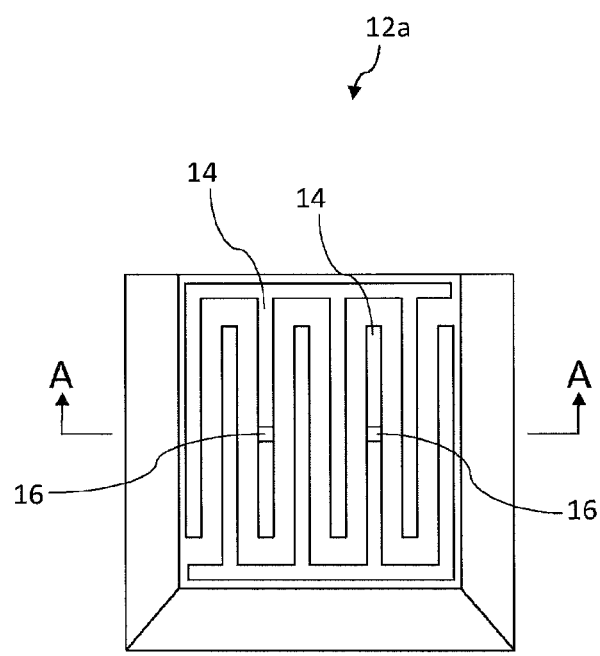
FIG. 4 is a top view of the preserved groove of the keycap of the physical keyboard according to the first embodiment of the present invention.

Subsequently, refer to FIG. 3 and FIG. 4 together. FIG. 3 is an axonometric view of a preserved groove of the keycap 12a of the physical keyboard 18 according to the first embodiment of the present invention. FIG. 4 is a top view of the preserved groove of the keycap 12a of the physical keyboard 18 according to the first embodiment of the present invention. Manufacturing methods of the keycap 12a and the touch key part 10 are described below. In some embodiments, after plastic injection molding is performed on the keycap 12a by means of a keycap mould, a touch key part groove 14 fitting distribution shapes of the first detection electrode 10a and the second detection electrode 10b, and a through hole 16 located below the first detection electrode 10a and the second detection electrode 10b are manufactured by means of a chemical etching or laser etching process. Subsequently, a highly conductive material in liquid is injected into the touch key part groove 14 and the through hole 16 by using a filling, coating, or printing technique and is waited to be consolidated. Alternatively, the molded touch key part 10 in solid state (such as a highly conductive polymer, or a copper foil) may be assembled in the touch key part groove 14 and the through hole 16 of the keycap 12a. In some embodiments, a double shot mould injection (that is, Double Shot Injection Molding, also referred to as overmolding) manufacturing process may also be used, and the keycap 12a and the touch key part 10 are manufactured by double shot plastic injection molding. For example, first-shot injection is performed on the highly conductive material by using a mould of the touch key part 10 including a pair of conductive bars, and after the highly conductive material is molded, a keycap mould is additionally assembled and second-shot injection is performed on an ABS (Acrylonitrile Butadiene Styrene Copolymers), PBT (Polybutylene Terephthalate), or POM (Polyformaldehyde) material. It is suitable contrariwise. First-shot injection is performed on ABS, PBT, or POM by using a keycap mould preserving the touch key part groove 14 and the through hole 16, and after ABS, PBT, or POM is molded, second-shot injection is performed on the highly conductive material. By means of the foregoing manufacturing methods, the highly conductive material may be disposed in the touch key part groove 14 and the through hole 16, so that the upper outer surface of the keycap 12a is flat. In this case, a position and a section of the foregoing through hole 16 depend on distribution and an interval between the first detection electrode 10a and the second detection electrode 10b. In addition, positions of a first conductive bar 24a and a second conductive bar 24b that are mentioned below should also be considered.

Figure 5:
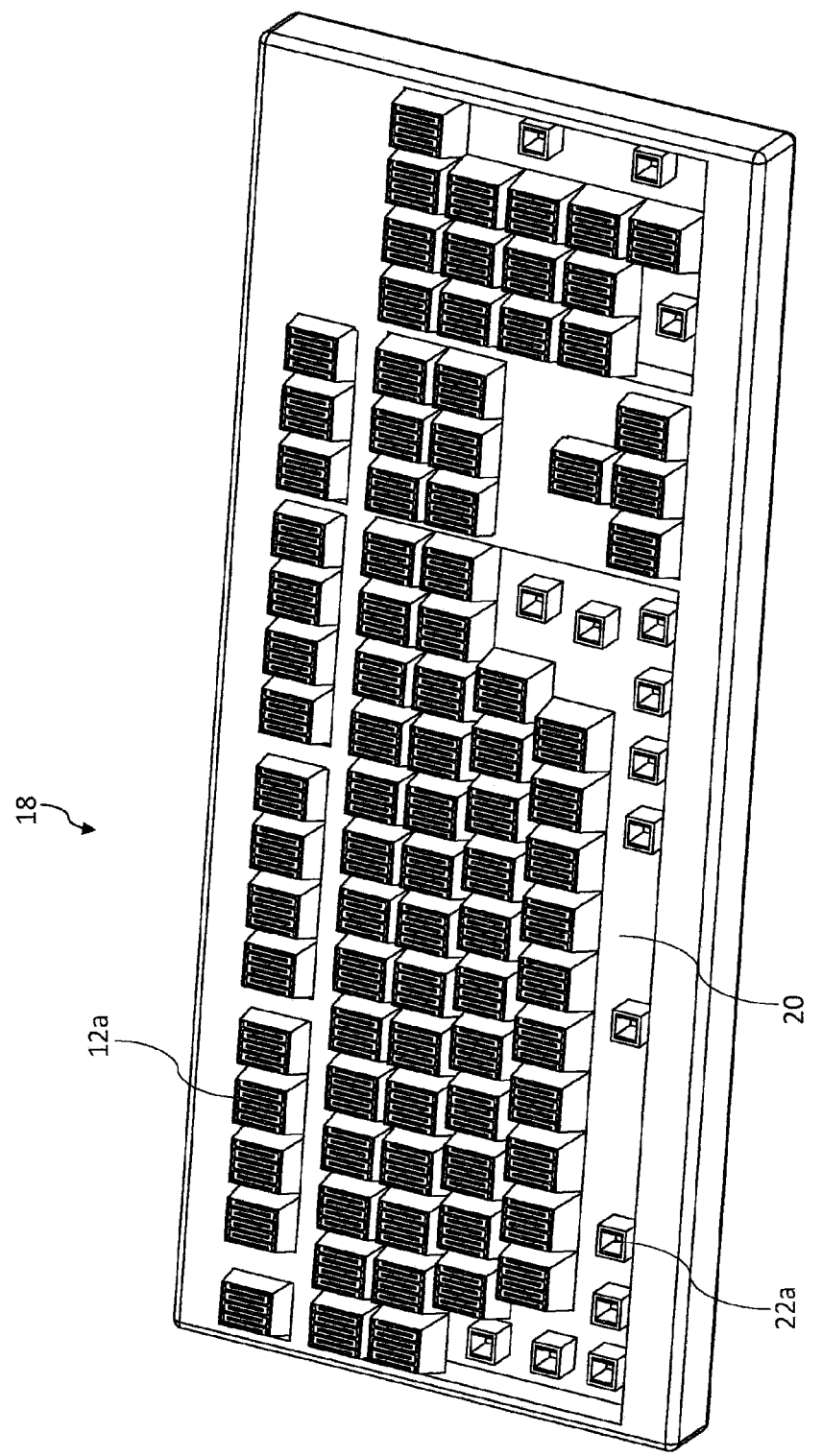
FIG. 5 is an axonometric view of the physical keyboard according to the first embodiment of the present invention.

Referring to FIG. 5, FIG. 5 is an axonometric view of a physical keyboard 18 according to the first embodiment of the present invention. For convenience of description below, the physical keyboard 18 in the figure is obtained after some keycaps 12a are removed to display structures of a supporting plate 20 and supporting housings 22a below the keycap 12a. In some embodiments, the supporting plate 20 is a part of an upper case (also referred to as a top-cover) of the physical keyboard 18, that is, the supporting plate 20 and the physical keyboard 18 are an integral located on an upper surface of the physical keyboard 18. In other embodiments, the supporting plate 20 is located at a lower layer of the upper case of the physical keyboard 18. The supporting plate 20 of both embodiments is provided with the supporting housing 22a, and the supporting plate 20 is formed integrally with the supporting housings 22a. Apart from the keycap 12a, the supporting plate 20, and the supporting housing 22a, the physical keyboard 18 further includes components such as a first circuit board 28, a second circuit board 36a, an elastic component (such as a key switch 40 or a rubber dome 32), and a keyboard scanning circuit 60, which are described below.

Figure 6:
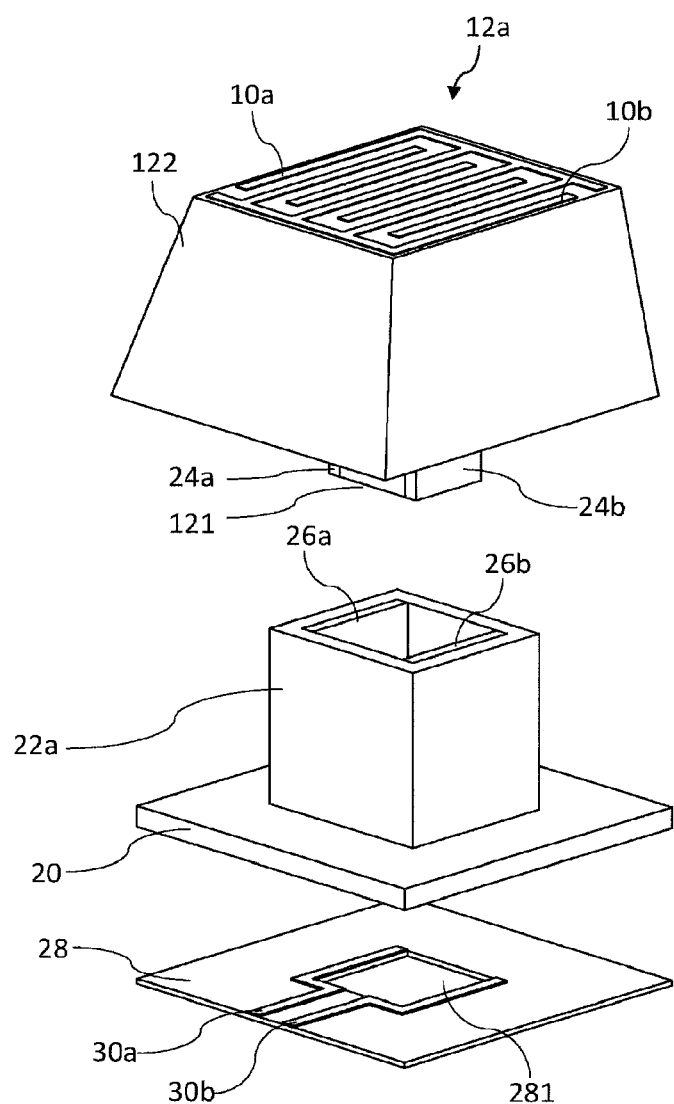
FIG. 6 is a schematic disassembled axonometric view from the keycap to a first circuit board of the physical keyboard according to the first embodiment of the present invention.

Referring to FIG. 6, FIG. 6 is a schematic disassembled axonometric top view from the keycap 12a to a first circuit board 28 of the physical keyboard 18 according to the first embodiment of the present invention. To make the figure clearer, full views of the supporting plate 20 and the first circuit board 28 are not completely drawn herein. The keycap 12a is mushroom-shaped and includes a keycap column 121 located in a lower end of the keycap 12a and a cap 122 fixed to an upper end of the keycap column 121. The supporting housing 22a is a hollow column having two openings at both ends. A tetragonal prism is used herein as an example, but in some embodiments, the supporting housing 22a may be a column of other geometric shapes, such as a cylinder. A lower end of the supporting housing 22a is a fixed end which is fixed to the supporting plate 20; and an upper end of the supporting housing 22a is an open end used to accommodate the keycap column 121 of the keycap 12a and can be combined to the keycap column 121, so that the keycap 12a is installed on the physical keyboard 18 after being assembled with the supporting housing 22a. The keycap column 121 may be hollow or solid, and a hollow keycap column 121 is used as an example here. An outer surface (that is, a surface neighboring to the supporting housing 22a) of the keycap column 121 is provided with a first conductive bar 24a and a second conductive bar 24b respectively corresponding to the positions of the through holes 16. In this case, the first conductive bar 24a and the second conductive bar 24b are disposed opposite to each other, that is, disposed on two opposite surfaces of the keycap column 121. An inner wall of the open end of the supporting housing 22a has a first conductive wall 26a and a second conductive wall 26b. Positions of the first conductive wall 26a and the second conductive wall 26b are disposed corresponding to positions of the first conductive bar 24a and the second conductive bar 24b of the keycap column 121. In a case when the keycap 12a is assembled on the supporting housing 22a, the first conductive wall 26a and the first conductive bar 24a are in mutual contact and electrically connected to each other; and the second conductive wall 26b and the second conductive bar 24b are in mutual contact and electrically connected to each other. The first conductive wall 26a runs through the supporting plate 20 and extends out of a bottom surface (that is, another surface opposite to the keycap 12a, and the surface facing the first circuit board 28) of the supporting plate 20; and the second conductive wall 26b runs through the supporting plate 20 and extends out of the bottom surface (that is, another surface opposite to the keycap 12a, and the surface facing the first circuit board 28) of the supporting plate 20.

Both the supporting housing 22a and the supporting plate 20 are made from a non-conductive material. In some embodiments, the supporting housing 22a and the supporting plate 20 are molded by means of plastic injection, and a conductive plate, such as a conductive plate made from a highly conductive polymer or a copper foil, is adhered to the inner wall (that is, the first conductive wall 26a and the second conductive wall 26b) of the supporting housing 22a. In some embodiments, a double shot mould injection manufacturing process may be used. A first-shot mould injection is performed on a non-conductive material (such as ABS) by using a supporting plate mould to manufacture the supporting plate 20 and the supporting housings 22a, and after the supporting plate 20 and the supporting housings 22a are molded, a second-shot mould injection is performed on a highly conductive material to manufacture the first conductive wall 26a and the second conductive wall 26b.

Figure 7:
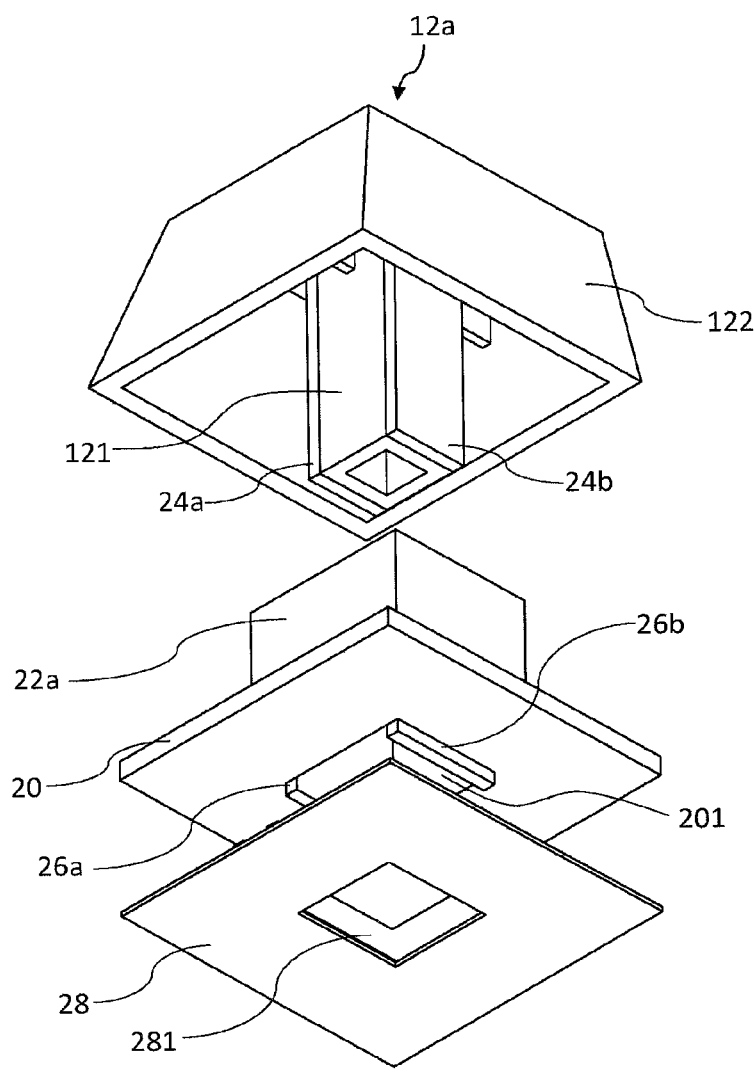
FIG. 7 is a schematic disassembled axonometric bottom view from the keycap to the first circuit board of the physical keyboard according to the first embodiment of the present invention.

FIG. 7 is a schematic disassembled axonometric bottom view from the keycap 12a to the first circuit board 28 of the physical keyboard 18 according to the first embodiment of the present invention. Referring to FIG. 6 and FIG. 7 together, FIG. 6 and FIG. 7 describe a conductive distribution from the touch key part 10 on the keycap 12a to the first circuit board 28. The conductive distribution is correspondingly disposed on the keycap 12a and the keycap column 121 fixed to each other and is electrically connected to the touch key part 10 of the keycap 12a. Specifically, the conductive distribution is mainly formed by the first conductive bar 24a, the second conductive bar 24b, the first conductive wall 26a, and the second conductive wall 26b described below and is electrically connected between the touch key part 10 and the first conductive wire 30a and second conductive wire 30b. The first detection electrode 10a is connected to the first conductive bar 24a by using a conductor inside the through hole 16. After the keycap 12a is assembled on the supporting housing 22a (the keycap column 121 at the lower end of the keycap 12a is assembled in the supporting housing 22a), the first conductive bar 24a is connected to the first conductive wall 26a, and the first conductive wall 26a runs through the supporting plate 20 and extends out of a bottom surface (that is, the surface facing the first circuit board 28) of the supporting plate 20. A lower part of the supporting plate 20 is provided with the first circuit board 28, of which a side neighboring to the supporting plate 20 is a circuit and a position corresponding to the keycap 12a is provided with the first conductive wire 30a and the second conductive wire 30b. When the circuit of the first circuit board 28 is upward attached to the lower part of the supporting plate 20, the first conductive wall 26a and the first conductive wire 30a are connected in conduction. Based on this, a 3-dimensional and movable conductive distribution is completed between the first detection electrode 10a and the first conductive wire 30a. A layout and a connection manner between the second detection electrode 10b and the second conductive wire 30b are the same as the layout and connection manner between the first detection electrode 10a and the first conductive wire 30a described above. A conductive distribution in an order of the second detection electrode 10b, the second conductive bar 24b and the second conductive wall 26b to the second conductive wire 30b can also be formed, and details are not described herein again. After assembling is completed, when a finger does not touch the keycap 12a, a coupling capacitor exists between the first detection electrode 10a and the second detection electrode 10b, and in this case, there is a fixed value of the capacitor. After the finger touches the keycap 12a, a change in the charges between the first detection electrode 10a and the second detection electrode 10b causes the value of the coupling capacitor to change. The conductive distribution between the touch key part 10 and the first circuit board 28 is electrically connected to a touch control determining unit 48 (shown in FIG. 14), so that the touch control determining unit 48 detects, by using the conductive distribution, a change in the value of the coupling capacitor caused by a touch of a user on the touch key part 10 of the keycap 12a, to generate a key signal (referred to as "a first key signal" below).

In some embodiments, to ensure good contact between the first conductive bar 24a and the first conductive wall 26a, and between the second conductive bar 24b and the second conductive wall 26b, that keystroke feelings are not affected when the first conductive bar 24a, the first conductive wall 26a, the second conductive bar 24b, and the second conductive wall 26b are excessively close to each other, not only precisely dimensional designing and manufacturing, and a coefficient of friction of a material from which a conductive bar and a conductive wall are made (under a condition when other factors are the same, the lower coefficient of friction relative to the two indicates smoother of the keystrokes) are considered, but also an appropriate amount of conductive ointment may further be added to increase contact areas of the two, reduce the coefficient of friction, and reduce the occurrence of air gaps. The conductive ointment is a thickening lubricant and includes a superfine conductive raw material (such as ultrafine copper powder).

In this embodiment, two sides of the inner wall of the supporting housing 22a, that are not neighboring, are provided with the first conductive wall 26a and the second conductive wall 26b (that is, the first conductive wall 26a and the second conductive wall 26b are correspondingly disposed), corresponding to the positions of the first conductive bar 24a and the second conductive bar 24b. In some embodiments, the first conductive wall 26a and the second conductive wall 26b may be disposed at two neighboring sides of the inner wall of the supporting housings 22a, or the same side of the inner wall. If the first conductive wall 26a and the second conductive wall 26b are at the same side, the first conductive wall 26a and the second conductive wall 26b are not connected to each other. However, no matter the first conductive wall 26a and the second conductive wall 26b are disposed at neighboring sides or sides that are not neighboring, or even on the same side, the first conductive wall 26a and the second conductive wall 26b need to be disposed corresponding to the first conductive bar 24a and the second conductive bar 24b.

Figure 8:
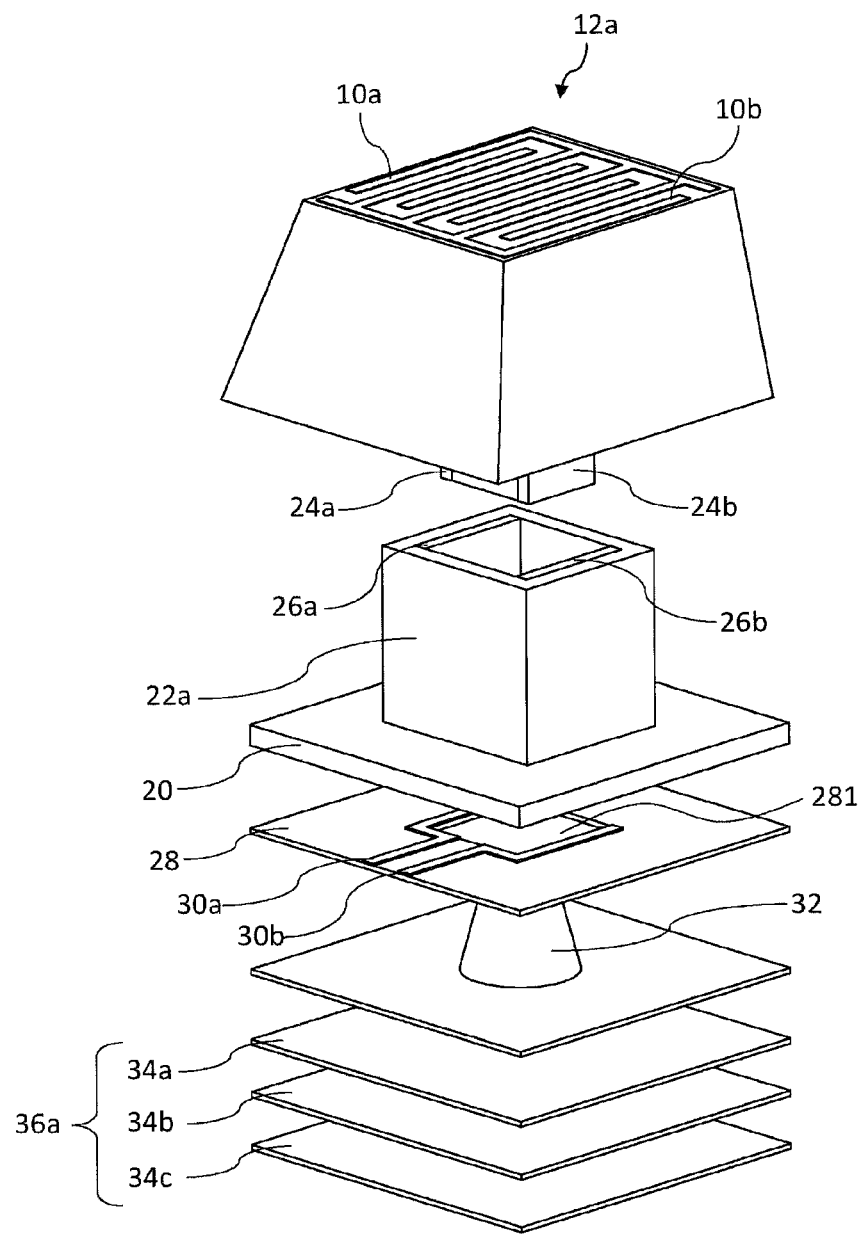
FIG. 8 is a schematic disassembled axonometric view from the keycap to a second circuit board of the physical keyboard according to the first embodiment of the present invention.
Figure 9:
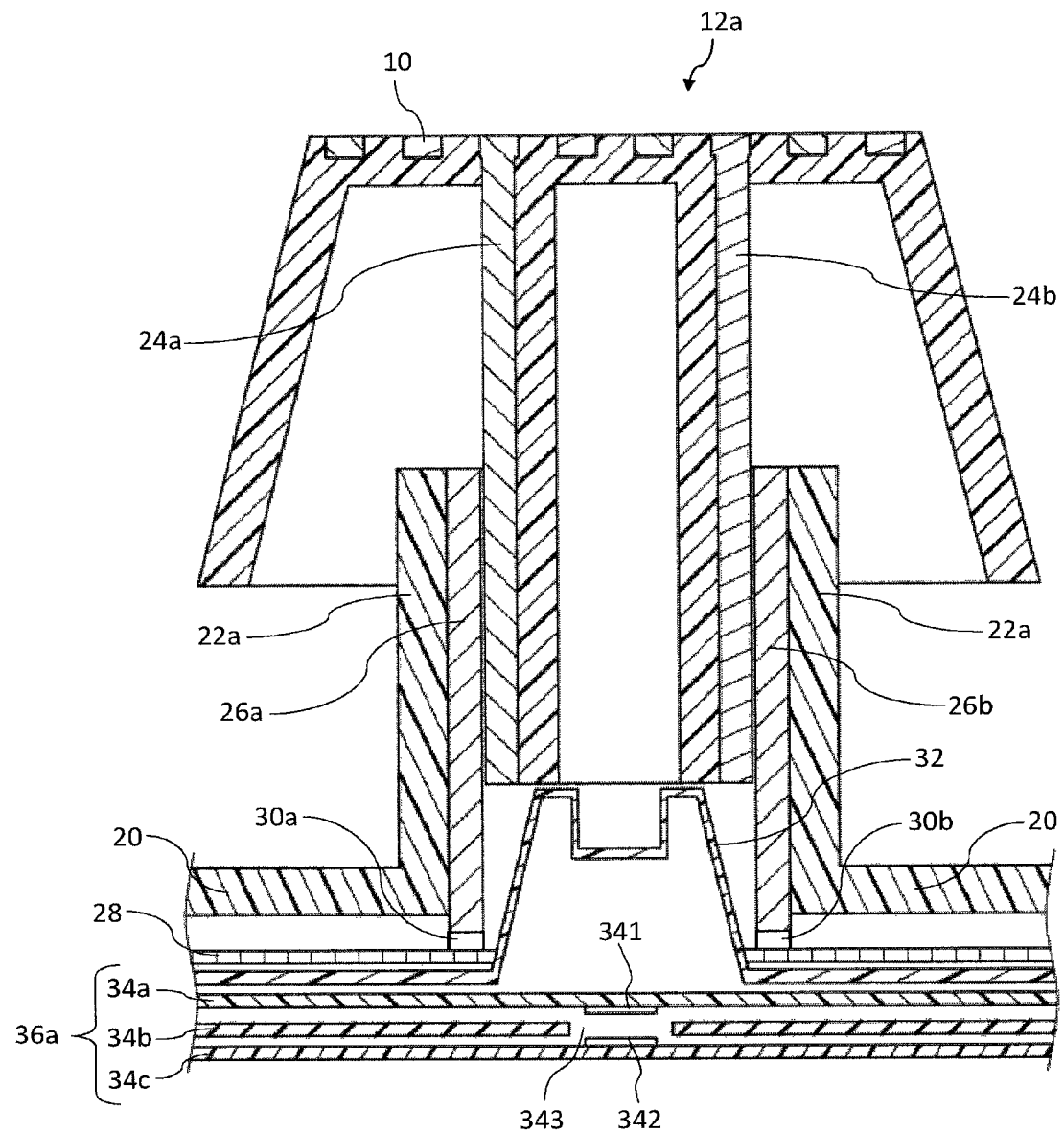
FIG. 9 is a sectional view from the keycap to the second circuit board of the physical keyboard according to the first embodiment of the present invention.

Refer to FIG. 8 and FIG. 9 together. FIG. 8 is a schematic disassembled axonometric view from the keycap 12a to a second circuit board 36a of the physical keyboard 18 according to the first embodiment of the present invention. FIG. 9 is a sectional view, along an A-A line of FIG. 4, from the keycap 12a to the second circuit board 36a of the physical keyboard 18 according to the first embodiment of the present invention. The conductive distribution between the touch key part 10 of the keycap 12a and the first circuit board 28 is described above, and details are not described herein again. The second circuit board 36a includes a plurality of key contact points and a plurality of elastic components configured respectively corresponding to the key contact points (herein, a rubber dome 32 is used as an example for description). Each elastic component receives squeezing of a corresponding keycap column 121, so that a corresponding key contact point is stressed and changes from a normally open state (non-conductive state) to a conductive state, by which the second circuit board 36a can generate a second key signal. Further descriptions are made below. The second circuit board 36a may include an upper layer thin film circuit board 34a, an insulating layer 34b, and a lower layer thin film circuit board 34c layered according to a sequence (the three are collectively referred to as the second circuit board 36a, that is, a thin film circuit board, also referred to as a membrane circuit board). The rubber dome 32 is disposed on above of the upper layer thin film circuit board 34a. A via 201 (shown in FIG. 7) is further provided at a position of the supporting plate 20 corresponding to the lower part of the keycap column 121, and a via 281 is also provided at a position of the first circuit board 28 corresponding to the lower part of the keycap column 121, so that when the keycap 12a is depressed, the keycap column 121 can move through the via 201 and 281 towards the second circuit board 36a, and further squeeze the rubber dome 32. In addition, the via 281 is located between the first conductive wire 30a and the second conductive wire 30b. A circuit of the upper layer thin film circuit board 34a is downward and a connection point 341 is disposed at a lower part of the upper layer thin film circuit board 34a corresponding to the rubber dome 32, and a circuit of the lower layer thin film circuit board 34c is upward and a connection point 342 is also disposed at a lower part of the lower layer thin film circuit board 34c corresponding to the rubber dome 32. The connection points 341 and 342 (collectively referred to as "key contact points") of the upper layer thin film circuit board 34a and the lower layer thin film circuit board 34c are separated by the insulating layer 34b. The insulating layer 34b is provided with an opening 343 at a position corresponding to the key contact points, that is, the connection points 341 and 342 of the upper layer thin film circuit board 34a and the lower layer thin film circuit board 34c are in normally open state. After a user depresses the keycap 12a, the keycap column 121 at the lower end of the keycap 12a squeezes down the rubber dome 32, so that the connection point 341 of the upper layer thin film circuit board 34a runs through the opening 343 of the insulating layer 34b and is connected to the connection point 342 of the lower layer thin film circuit board 34c, becoming a conductive state. In other words, the keycap 12a is depressed so that the key contact points of the second circuit board 36a are in the conductive state for the user to generate a key signal (that is, a second key signal) in a keystroke operation manner. The "keystroke" (that is, "depressing", or "depressing then releasing") includes key-down (generate "Make Code") and key-up (generate "Break Code") of a key. This embodiment is applicable to a thin film type keyboard, that is, the second circuit board 36b is a thin film type circuit board.

To describe that the first conductive wall 26a and the second conductive wall 26b run through the supporting plate 20 and extend out of the bottom surface of the supporting plate so as to be connected to the first conductive wire 30a and the second conductive wire 30b, extended parts of the first conductive wall 26a and the second conductive wall 26b, and thicknesses of the first conductive wire 30a and the second conductive wire 30b are deliberately highlighted herein, which causes an illusion that there is a large gap between the supporting plate 20 and the first circuit board 28 in the figure. Actually, the supporting plate 20 and the first circuit board 28 are closely attached to each other.

In some embodiments, the first conductive wire 30a and the second conductive wire 30b are directly wiring at a bottom side of the supporting plate 20 corresponding to another surface of the supporting housing 22a and are in conduction with the first conductive wall 26a and the second conductive wall 26b. That is, in this embodiment, the first circuit board 28 is integrated with the supporting plate 20, and the bottom side (that is, an original position of the first circuit board 28 in FIG. 9) of the supporting plate 20 is coated or attached with a thin film to protect the first conductive wire 30a and the second conductive wire 30b at the bottom side of the supporting plate 20.

Figure 10:
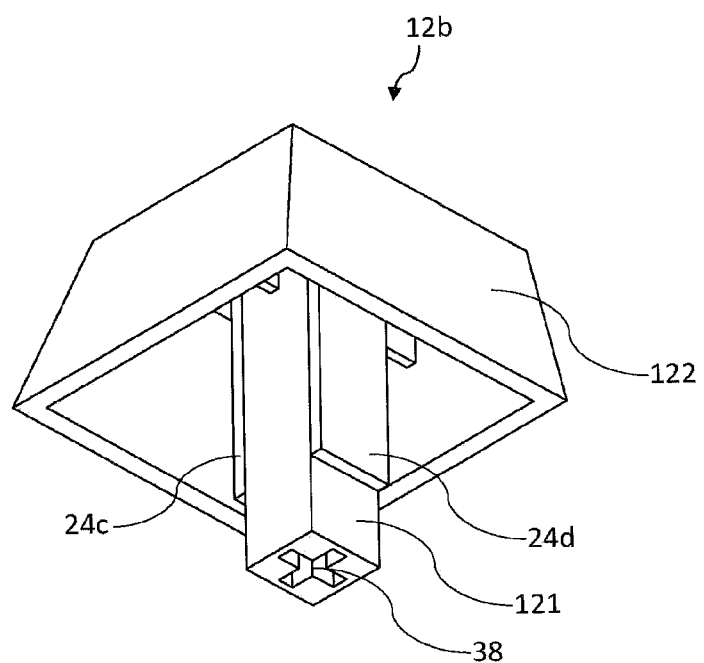
FIG. 10 is an axonometric bottom view of a keycap of a physical keyboard according to a second embodiment of the present invention.
Figure 11:
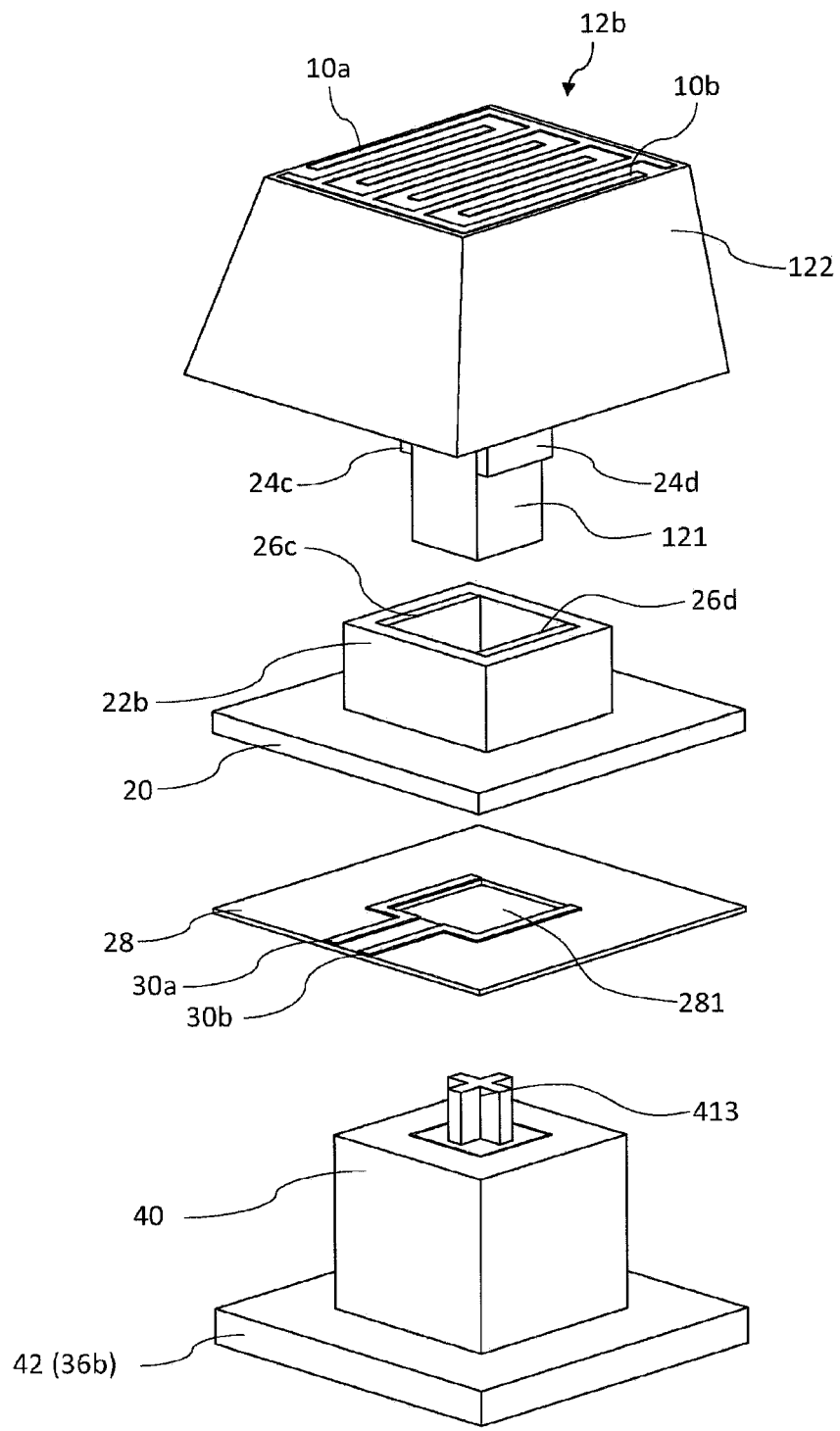
FIG. 11 is a schematic disassembled axonometric view from the keycap to a second circuit board of the physical keyboard according to the second embodiment of the present invention.
Figure 12:
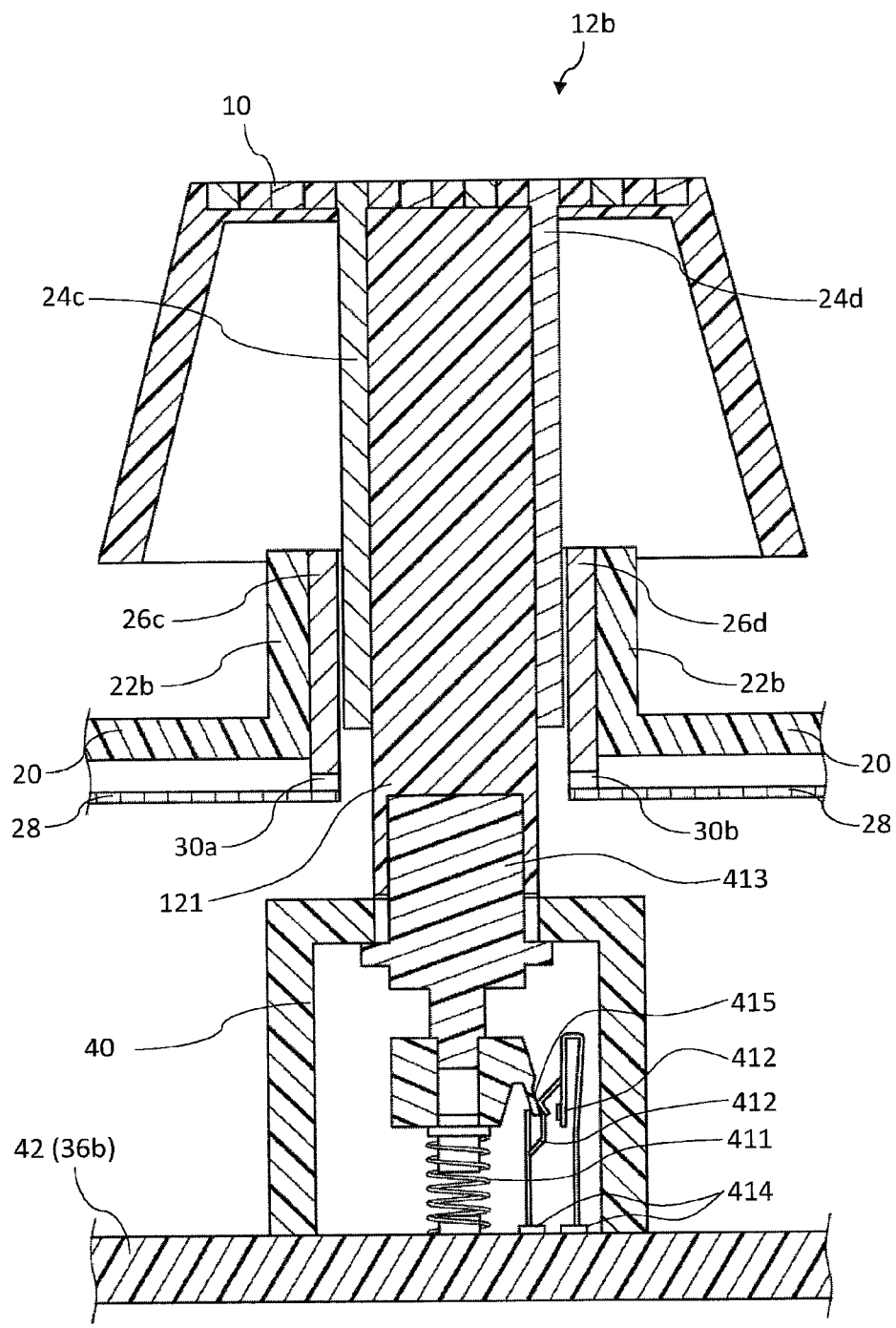
FIG. 12 is a sectional view from the keycap to the second circuit board of the physical keyboard according to the second embodiment of the present invention.

Referring to FIG. 10, FIG. 11, and FIG. 12, FIG. 10, FIG. 11, and FIG. 12 are schematic diagrams of a second embodiment of the present invention. Same parts of this embodiment and the first embodiment are represented by same structures and component symbols and are not described again. FIG. 10 is an axonometric bottom view of a keycap 12b of a physical keyboard 18 according to a second embodiment of the present invention. FIG. 11 is a schematic disassembled axonometric view from the keycap 12b to a second circuit board 36b of the physical keyboard 18 according to the second embodiment of the present invention. FIG. 12 is a sectional view (the same as FIG. 4, the section view taken along the A-A line of two through holes 16) from the keycap 12b to the second circuit board 36b of the physical keyboard 18 according to the second embodiment of the present invention. This embodiment is applicable to a mechanical keyboard, that is, the rubber dome 32 in the previous embodiment is replaced with a key switch 40 (also referred to as a mechanical switch). The upper layer thin film circuit board 34a, the insulating layer 34b, and the lower layer thin film circuit board 34c in the previous embodiment are replaced with a printed circuit board 42. A top end of the key switch 40 includes a stem 413 of the key switch. In this embodiment, the stem 413 of the key switch has a cross-shaped stem (also referred to as Cherry MX Mount), which is one of commonly-seen standard stems of the mechanical keyboard. To combine with the cross-shaped stem of the key switch 40, a cross groove 38 is provided at a lower end of the keycap column 121 of the keycap 12b in this embodiment. In some other embodiments, the stem 413 of the key switch 40 may also use a flat-shaped stem (also known as flat-head stem, not shown), and a flat-shaped groove (not shown) is provided at the lower end of the keycap column 121 of the keycap 12b. In other words, a groove fitting a shape of the stem 413 of the key switch 40 may be provided at the lower end of the keycap column 121 of the keycap 12b. The key switch 40 has accommodation space inside which can accommodate a spring 411 and two copper foils 412. Before the keycap 12b is depressed, the key switch 40 has an isolating branch 415 located between the two copper foils 412, so that the two copper foils 412 are non-conductive. When the keycap 12b is depressed, the keycap column 121 of the keycap 12b pushes down the stem 413 of the key switch 40 into the accommodation space, so that the two copper foils 412 inside the key switch 40 are in mutual contact and conductive. The copper foils 412 are respectively electrically connected to two key contact points (a key contact point 414 is in a normally open state) on the printed circuit board 42, so that the key contact point 414 is in a conductive state to generate a key signal (that is, a second key signal of the present invention, a "Make Code"). Later, when a finger moves away from the keycap 12b, the spring 411 inside the key switch 40 rebounds the stem 413 of the key switch 40 back to its original place (an original position), and the copper foil 412 also leaves the key contact point 414, that generates the second key signal again (that is, a "Break Code"). To ensure that the stem 413 can be pushed into the key switch 40, the first conductive bar 24c and the second conductive bar 24d in this embodiment are shorter than the first conductive 24a bar and the second conductive bar 24b in the previous embodiment, but still have enough contacting areas to be connected to the first conductive wall 26c and the second conductive wall 26d of the inner wall of the supporting housings 22b.

To describe that the first conductive wall 26c and the second conductive wall 26d run through the supporting plate 20 and extend out of the bottom surface of the supporting plate 20 so as to be connected to the first conductive wire 30a and the second conductive wire 30b, extended parts of the first conductive wall 26c and the second conductive wall 26d, and thicknesses of the first conductive wire 30a and the second conductive wire 30b are deliberately highlighted herein, which causes an illusion that there is a large gap between the supporting plate 20 and the first circuit board 28 in the figure. Actually, the supporting plate 20 and the first circuit board 28 are closely attached to each other.

In some embodiments, the first conductive wire 30a and the second conductive wire 30b are directly wiring at a bottom side of the supporting plate 20 corresponding to another surface of the supporting housing 22a and are in conduction with the first conductive wall 26c and the second conductive wall 26d. That is, in this embodiment, the first circuit board 28 is integrated with the supporting plate 20, and the bottom side (that is, an original position of the first circuit board 28 in FIG. 12) of the supporting plate 20 is coated or attached with a thin film to protect the first conductive wire 30a and the second conductive wire 30b at the bottom side of the supporting plate 20.

Figure 13:
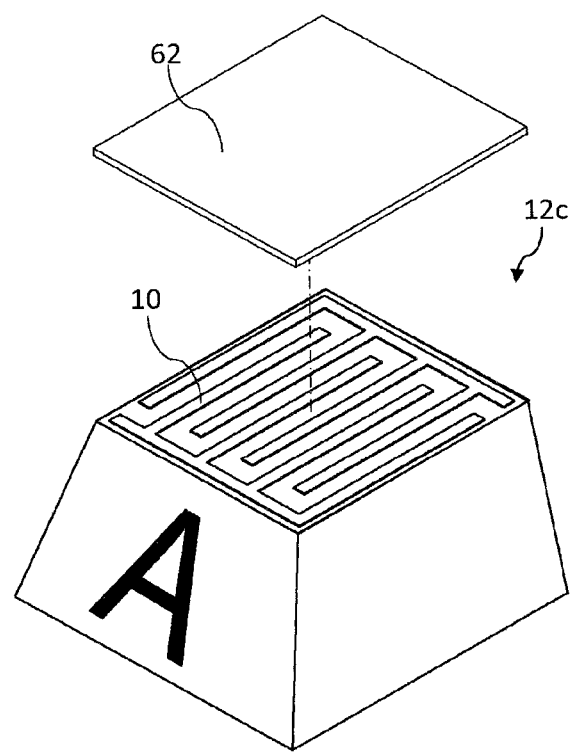
FIG. 13 is an axonometric view of a keycap of a physical keyboard according to third embodiment of the present invention.

Referring to FIG. 13, FIG. 13 is schematic disassembled axonometric view of a keycap 12c of a physical keyboard 18 according to a third embodiment of the present invention. A letter/number/symbol mark (a letter "A" herein in capital) may be printed on a side surface (that is, a side facing a user) of the keycap 12c neighboring to the side of the touch key part 10. In addition, a covering layer 62 may also be disposed on the keycap 12c to protect the touch key part 10. In some embodiments, a letter/number/symbol mark represented by each key may be printed on the upper part (not shown) of the keycap 12c. In this case, a transparent or colored covering layer 62 may be disposed on the keycap 12c, and the letter/number/symbol mark represented by each key may be printed on the covering layer. Alternatively, the letter/number/symbol mark represented by each key may be printed on the keycap 12c first, and then a transparent covering layer 62 may be provided.

Figure 14:
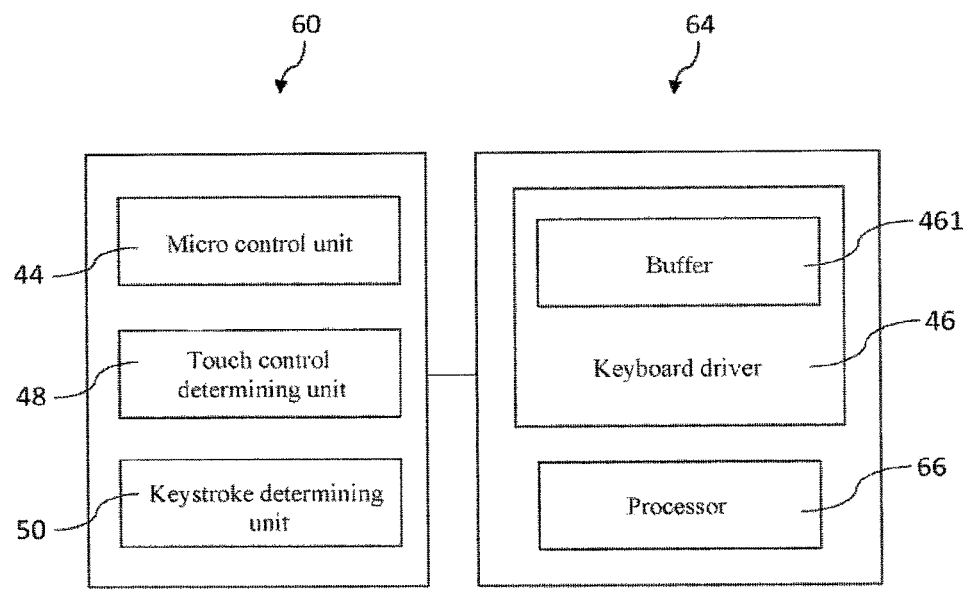
FIG. 14 is a systematic block diagram (1) of keyboard scanning circuit of the physical keyboards and a computing devices corresponding to the keyboard scanning circuit according to the first, the second, and the third embodiment of the present invention.
Figure 15:
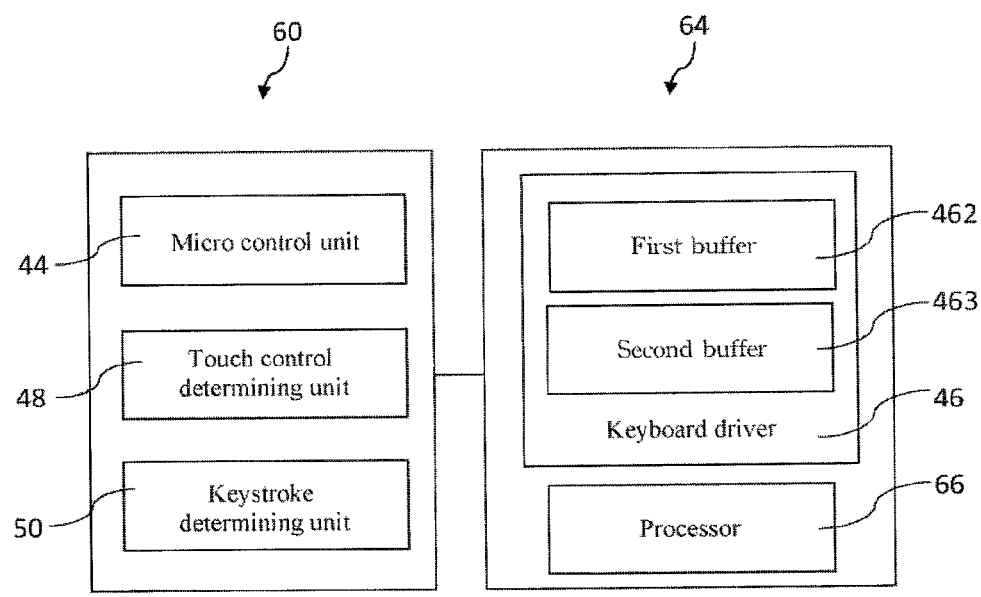
FIG. 15 is a systematic block diagram (2) of keyboard scanning circuit of the physical keyboards and the computing devices corresponding to the keyboard scanning circuit according to the first, the second, and the third embodiment of the present invention.
Figure 16:
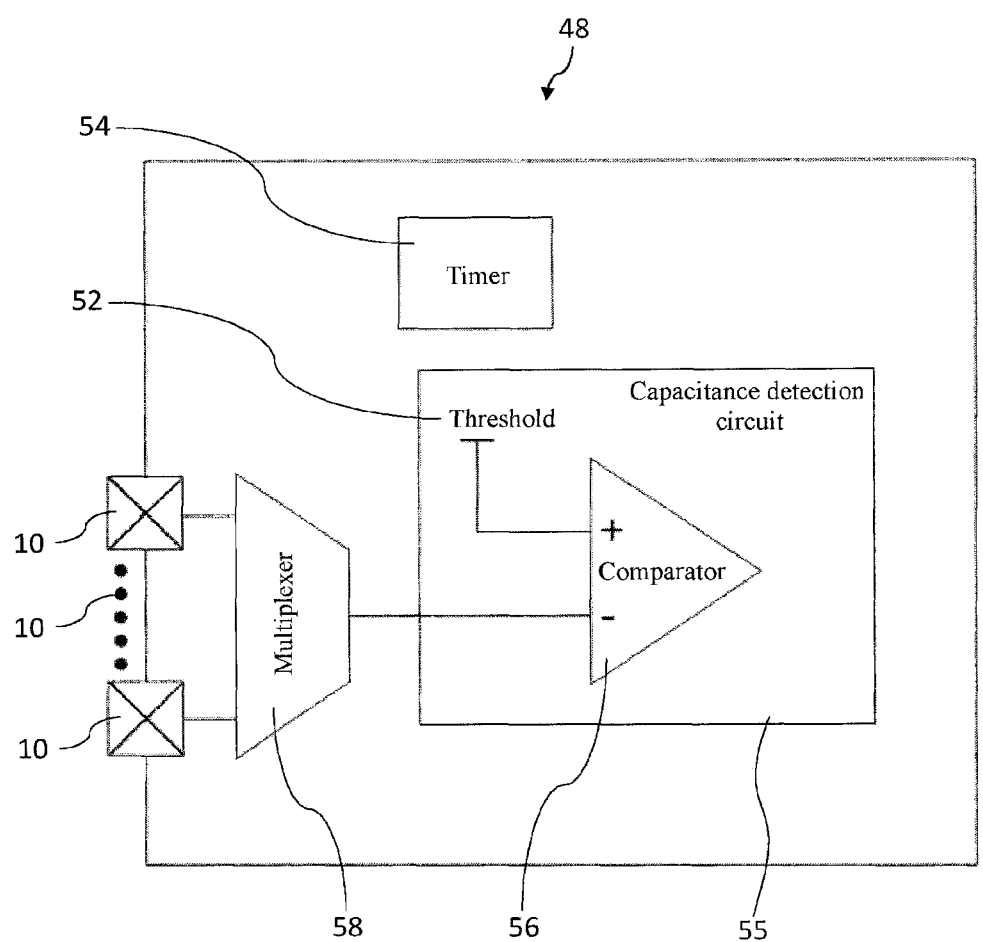
FIG. 16 is a circuit diagram of touch control determining units of the physical keyboards according to the first, the second, and the third embodiment of the present invention.

Referring to FIG. 14, FIG. 15 and FIG. 16 together, FIG. 14 and FIG. 15 are systematic block diagrams of keyboard scanning circuit 60 of the physical keyboards 18 and a computing devices 64 corresponding to the keyboard scanning circuit 60 according to the first, the second, and the third embodiment of the present invention, and FIG. 16 is a circuit diagram of a touch control determining unit 48 of the physical keyboard 18. The keyboard scanning circuit 60 may be located on a circuit board independent of the first circuit board 28 and the second circuit board 36b that are described above, or may be partially or integrally disposed on the first circuit board 28 or the second circuit board 36b. Position relationships between the keyboard scanning circuit 60 and the first circuit board 28 and the second circuit board 36b are not limited in this embodiment of the present invention. The keyboard scanning circuit 60 includes a micro control unit 44, a touch control determining unit 48, and a keystroke determining unit 50, which may have independent circuits or may be integrated together, for example, implemented as a single integrated circuit (IC). The computing device 64 includes a processor 66 and a keyboard driver 46. The keyboard driver 46 is stored in a storage medium, such as a non-volatile memory, hard disk drive, a solid-state drive, or a memory card. The keyboard driver includes a buffer 461. The keyboard scanning circuit 60 is in communication connection with the computing device 64, that is, the physical keyboard 18 and the computing device 64 are in communication connection with each other. A communication connection method includes a 5-pin DIN connector (an AT/XT keyboard), a 6-pin Mini-DIN connector (a PS/2 keyboard), a USB connector (a USB keyboard), Bluetooth/RF/Wi-Fi (a wireless keyboard), etc.

The touch control determining unit 48 includes a timer 54 and a capacitance detection circuit 55 connected to each other. The capacitance detection circuit 55 includes a comparator 56. A method for comparing changes in capacitance values by the capacitance detection circuit 55 includes a relaxation oscillator (alternatively referred to as an RC oscillation method) detection, charge transfer (alternatively referred to as comparison of charges) or continuous approximation (alternatively referred to as capacitance coupling analog conversion by using a capacitance-to-voltage convertor and an analog-to-digital convertor). If relaxation oscillator detection is used, the timer 54 is configured to calculate an RC oscillation frequency or period. If the charge transfer or the continuous approximation is used, the timer 54 is configured to time a charging time of the coupling capacitor. The touch control determining unit 48 is electrically connected to conductive wire 30*a* and 30*b* corresponding to each keycap 12*a*, 12*b*, or 12*c* and is configured to compare changes (which may virtually be changes in voltage of corresponding ends or changes in oscillation frequencies/periods) in values of the coupling capacitor of the keycap 12*a*, 12*b*, or 12*c* according to a threshold 52. When the changes exceed a threshold 52, it is determined that the keycap 12*a*, 12*b*, or 12*c* is detected to be touched, and a first key signal is generated. The threshold 52 may be set as a certain voltage value (not described in detail herein) by using a bleeder circuit, or the value (or a terminal voltage value or an oscillation frequency) of the coupling capacitor converted by using the analog-to-digital convertor in a digital manner is compared with the threshold set as the certain value.

The micro control unit 44 stores the first key signal to the buffer 461 by using the keyboard driver 46 and sends an interrupt request to the processor 66 of the computing device 64. The first key signal includes the code corresponding to the keycap 12*a*, 12*b*, or 12*c*. Subsequently, the processor 66 of the computing device 64 responds to the interrupt request and reads the first key signal from the buffer 461, so that the processor 66 can tell which one of the keycap 12*a*, 12*b*, or 12*c* is touched. The buffer 46 uses first-in first-out (FIFO) data structure.

The keystroke determining unit 50 is electrically connected to the connection points 341 and 342 alternatively referred to as the key contact point 414, corresponding to each keycap 12*a*, 12*b*, or 12*c*, and is configured to detect changes in the connection points 341 and 342 (key contact point 414) from a normally open state to a conductive state due to a keystroke, to generate a second key signal. The micro control unit 44 stores the second key signal to the buffer 461 by using the keyboard driver 46 and sends an interrupt request to the processor 66 of the computing device 64. The second key signal includes the code corresponding to the keycap 12*a*, 12*b*, or 12*c*. Subsequently, the processor 66 of the computing device 64 responds to the interrupt request and reads the second key signal from the buffer 461, so that the processor 66 can tell which one of the keycap 12*a*, 12*b*, or 12*c* is depressed.

In some embodiments, as shown in FIG. 15, a difference between FIG. 15 and FIG. 14 is that the buffer 461 is replaced with two independent buffers: a first buffer 462 and a second buffer 463. That is, the first key signal and the second key signal are respectively stored in the first buffer 462 and the second buffer 463 which are used to distinguish data types in the first buffer 462 and the second buffer 463 when the processor 66 of the computing device 64 performs reading.

In some embodiments, after the first key signal is stored to its dedicated first buffer 462, the processor 66 of the computing device 64 is not notified in a manner of sending an interrupt request, but the processor 66 of the computing device 64 automatically reads the first buffer 462 dedicated to the first key signal in a polling manner at set intervals. Similarly, after the second key signal is stored to its dedicated second buffer 463, the processor 66 of the computing device 64 can automatically read the second buffer 463 dedicated to the second key signal in a polling manner at set intervals.

In some embodiments, the touch control determining unit 48 further includes a multiplexer 58 electrically connected to the capacitance detection circuit 55, so that all or a part of touch key parts 10 share the timer 54 and the capacitance detection circuit 55, and the timer 54 and the capacitance detection circuit 55 are not repeatedly disposed.

In some embodiments, wiring on the first circuit board 28, connected to the first conductive wire 30*a* and the second conductive wire 30*b* corresponding to each keycap 12*a*, 12*b*, or 12*c* uses a matrix architecture and detects values of coupling capacitors corresponding to the keycaps 12*a*, 12*b* or 12*c* in a row/column scanning manner, to improve efficiency of the pins utilization of the touch control determining unit 48. That is, by means of the matrix architecture, quantity of connections of the conductive wires between the touch control determining unit 48 and the touch key parts 10 on the keycaps 12*a*, 12*b*, or 12*c* can be dramatically reduced.

It should be noted that the embodiments of the present invention are not intended to limit all keys on the physical keyboard 18 according to components of the foregoing structure. If a part of keys do not need a touch function, a conventional structure of a common key may also be used. In addition, the touch key part 10 and the conductive distribution (that is, the first conductive bars 24*a* and 24*c*, the second conductive bars 24*b* and 24*d*, the first conductive walls 26*a* and 26*c*, and the second conductive walls 26*b* and 26*d*) may be made from highly conductive materials, such as Indium Tin Oxide (ITO), Highly Conductive Polymer, Silver Nanowires, Metal Mesh, Graphene, and Carbon Nanotubes.

In conclusion, the physical keyboard 18 provided in the embodiments of the present invention receives a first key signal generated after a touch and a second key signal generated after a keystroke by using the first circuit board 28 and the second circuit boards 36*a* and 36*b*, so that a user can operate in a keystroke manner and a touch manner by using physical keys of the same physical keyboard 18, avoiding troubles of respectively generating two types of key signals by using two different apparatuses.

A method for displaying an on-screen keyboard, and a computer program product and a non-transitory computer readable medium of the on-screen keyboard described below in the present invention are implemented by using the physical keyboard 18 of the embodiments described above and a computing device.

Figure 17:
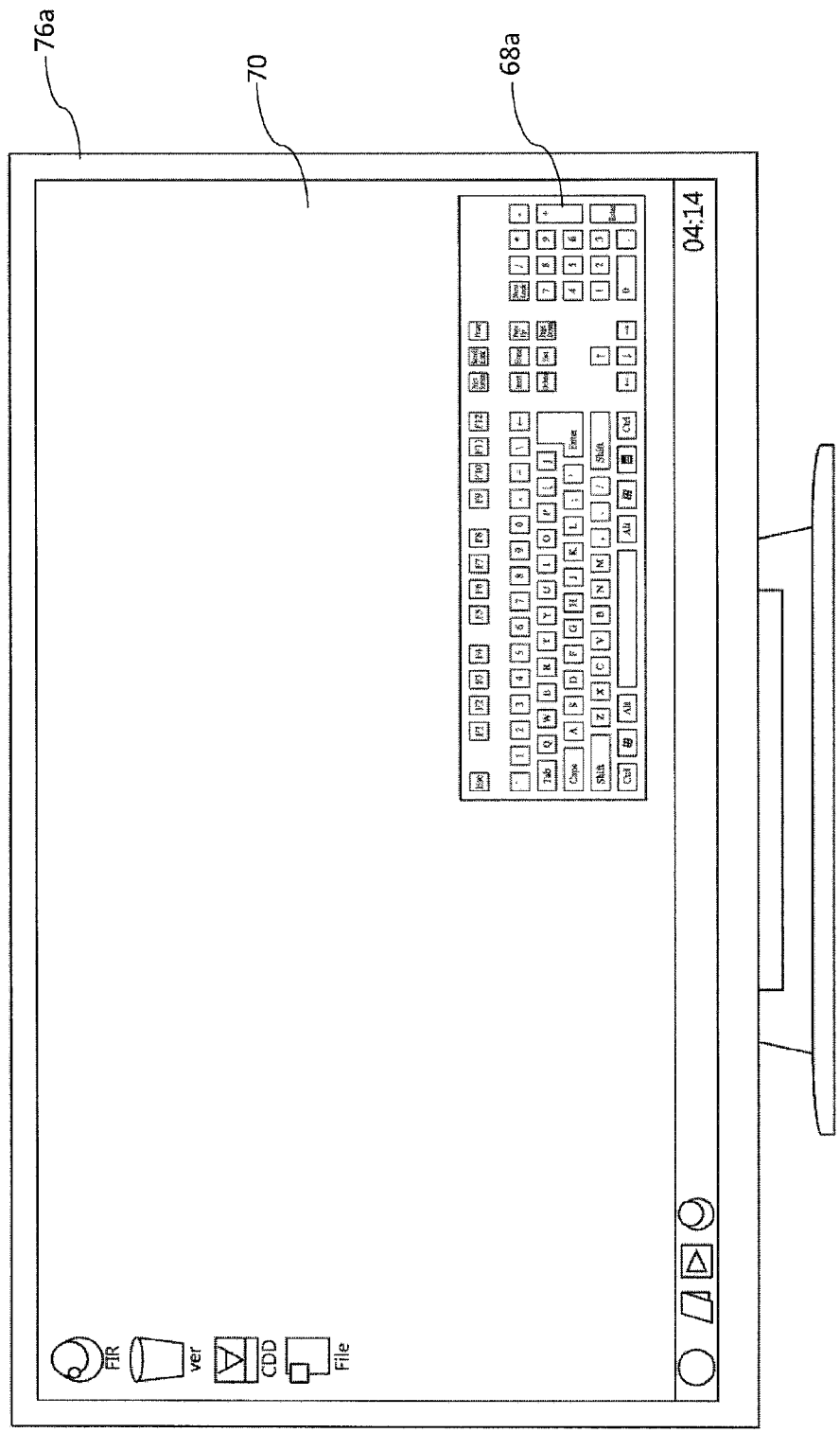
FIG. 17 is a schematic diagram (1) of an on-screen keyboard according to a first embodiment of the present invention.

Referring to FIG. 17 to FIG. 21, FIG. 17 to FIG. 21 are schematic diagrams of an on-screen keyboard 68*a* according to a first embodiment of the present invention. FIG. 17 describes displaying of the on-screen keyboard 68*a* of this embodiment on a screen 76*a* which is internally disposed on or externally connected to a computing device 64. After execution, the on-screen keyboard 68a is located on a topmost layer (that is, a view attribute is set as "Topmost") of an operating system desktop 70, that is, even if windows of other applications are displayed at the same position of the on-screen keyboard 68a, the windows still do not block displaying of the on-screen keyboard 68a. A keyboard layout of the on-screen keyboard 68a is drawn corresponding to a layout of a physical keyboard 18 (shown in FIG. 19), to avoid that the on-screen keyboard 68a is excessively different from real keys in positions, resulting in that the user is not adapted to the on-screen keyboard 68a. The on-screen keyboard 68a is a part of the computer program product.

Figure 18:
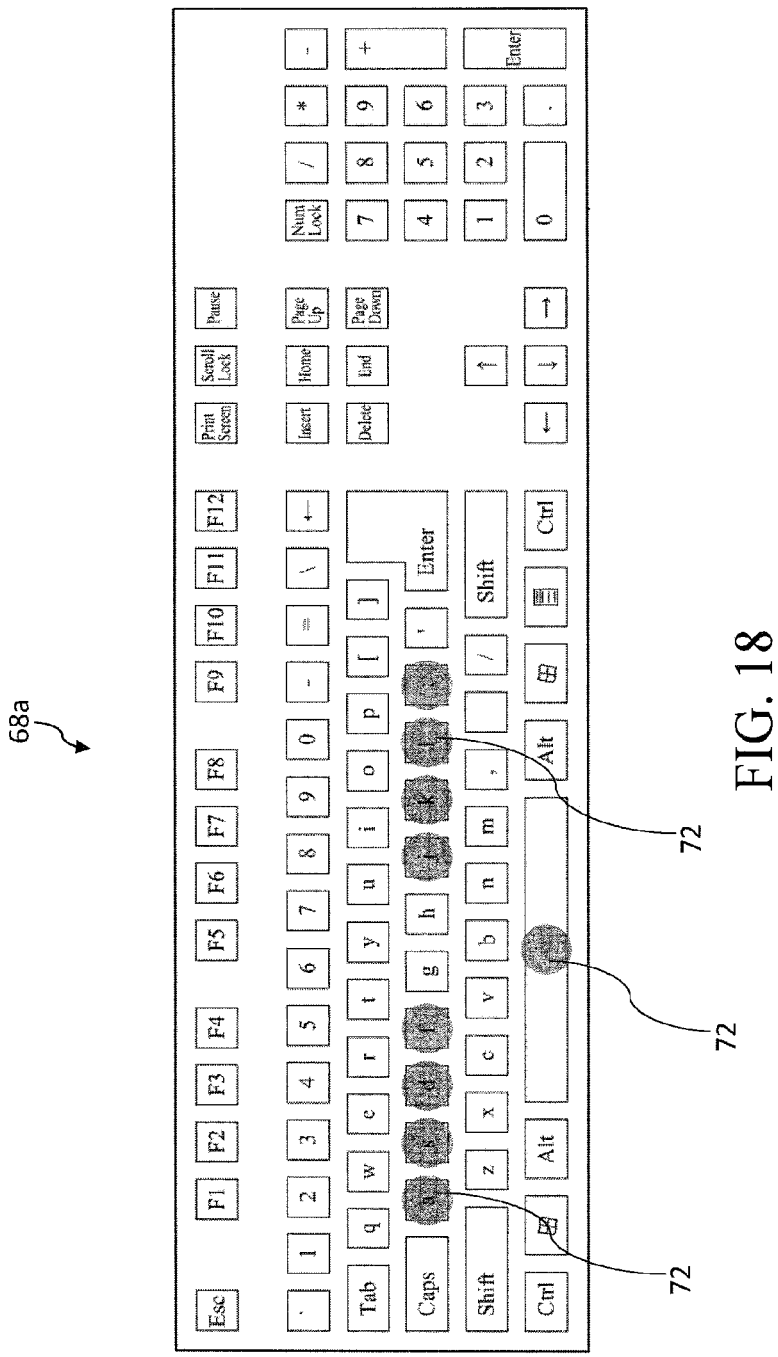
FIG. 18 is a schematic diagram (2) of the on-screen keyboard according to the first embodiment of the present invention.
Figure 19:
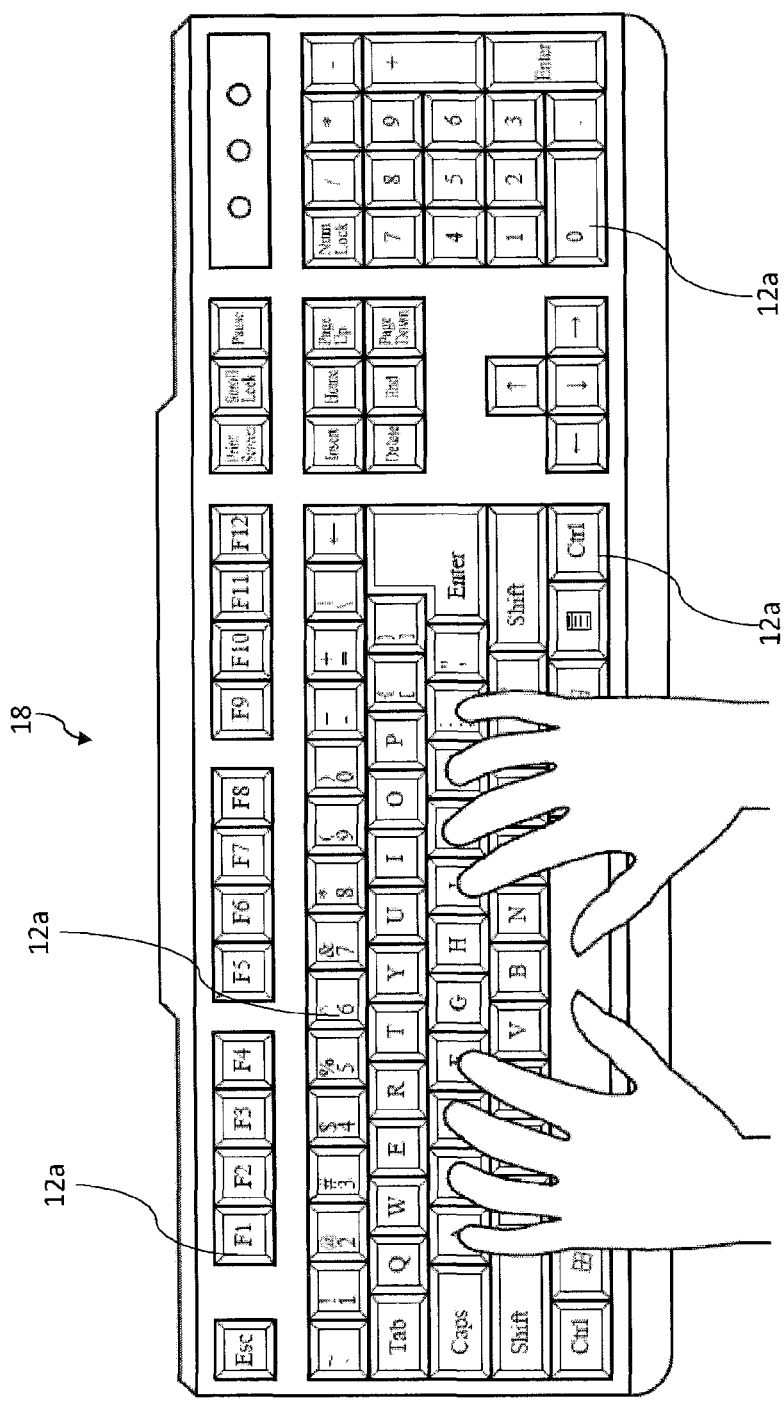
FIG. 19 is a schematic diagram (3) of the on-screen keyboard according to the first embodiment of the present invention.

FIG. 18 is an enlarged schematic diagram of the on-screen keyboard 68a and describes that when fingers of a user are touching the keycaps 12a of the physical keyboard 18, the on-screen keyboard 68a displays the first key marks 72 corresponding to the touched keycaps 12a. Herein, the marked positions of the first key marks 72 include a "key A", a "key S", a "key D", a "key F", a "key J", a "key K", a "key L", a "key ;" and a "space key". FIG. 19 corresponds to FIG. 18. FIG. 19 describes keycaps 12a of the "key A", the "key S", the "key D", the "key F", the "key J", the "key K", the "key L", the "key ;" and the "space key" on the physical keyboard 18 are being touched by the fingers of the user. When the fingers of the user are touching the keycaps 12a but not depressing the keys, in this case, the positions of the fingers are referred to as the "fingers standby positions" or the "fingers ready positions".

Figure 20:
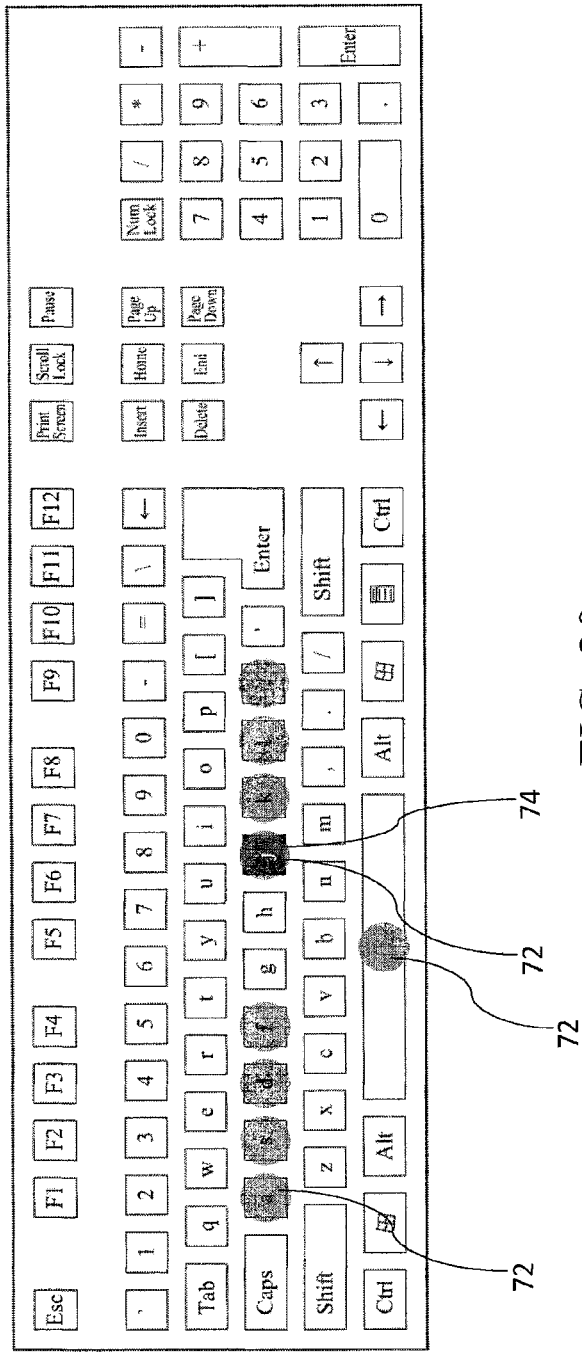
FIG. 20 is a schematic diagram (4) of the on-screen keyboard according to the first embodiment of the present invention.

FIG. 20 describes that the "key J" on the on-screen keyboard 68a is marked with both the first key mark 72 and a second key mark 74, that is, when the fingers of the user are touching the keycaps 12a of the "key A", the "key S", the "key D", the "key F", the "key J", the "key K", the "key L", the "key ;" and the "space key" on the physical keyboard 18, and at the same time the finger of the user is depressing the keycap 12a of the "key J". In other words, not only the keycap 12a of the "key J" is touched to generate a first key signal, but is also depressed to generate a second key signal (that is, a "Make Code"). This case occurs when the keycap 12a of the "key J" is depressed down (the "Make Code" is generated), but the keycap 12a of the "key J" is not released (the "Break Code" is not yet generated). When typing is performed at a normal speed, the second key mark 74 exists on the on-screen keyboard 68a for a considerably short time (or referred to as a display time) which is usually less than one second or even less than one tenth of a second, and is a flashing to human eyes.

Theoretically, it must be that the fingers touch the keycaps 12a first and then depress the keycaps 12a. If typing is performed at a relatively fast speed, and the finger does not touch the keycap 12a until a keystroke, the first key signal and the second key signal (that is, a "Make Code") of the same key are "almost" generated simultaneously (there is still a difference in time between the first key signal and the second key signal, but the difference might be counted in milliseconds). That is, the first key mark 72 and the second key mark 74 of the same key are displayed "almost" simultaneously (human eyes are not easy to perceive a difference in time so as to feel that the first key mark 72 and the second key mark 74 of the same key are simultaneously displayed) on the on-screen keyboard 68a. However, when the majority persons (specifically those who type with two hands in correct fingering) type, before depressing keys (for example, when the persons are considering which word is to be used), the persons are accustomed to placing fingers at the "home keys" (or referred to as a Home Row, that is on the keycap 12a touched by the fingers shown in FIG. 19), or placing fingers on a will-be-pressed keycap 12a. Then, the keycap 12a is depressed. That is, sometimes, a first key mark 72 of a key is displayed obviously earlier than a second key mark 74 of the same key on the on-screen keyboard 68a. In addition to that second key marks 74 of a few locking keys (such as a "caps-lock key", a "number-lock key", and a "scroll-lock key" of a locking-key type or an "insert key" of a modifier key type) are separately displayed on the on-screen keyboard 68a and do not coexist with the first key marks 72, as to keystrokes (which generate "Make Code") on other keys, the first key marks 72 must be displayed earlier than the second key marks 74, or both the first key marks 72 and the second key marks 74 are almost simultaneously displayed on the on-screen keyboard 68a, and it is not possible that the second key marks 74 are separately displayed without the first key marks 72. Visually, human eyes can obviously discriminate a difference between two overlapped marks and a single mark (using FIG. 21 as an example). Although the second key mark 74 is only a flashing to the human eyes, the second key mark 74 (shown in the top of FIG. 21) that exists separately is obvious different from two overlapped marks (shown in the bottom of FIG. 21), and specifically when the marks of two different colors are displayed in an overlapped manner, the upper-layer mark with incomplete transparency, will generate a visual effect of a third color. The human eyes can obviously distinguish a difference between the third color and colors of the two marks. Therefore, a principle that "the second key mark 74 cannot be separately displayed" can be used as an inspection mechanism visually. When a second key mark 74 of a key is separately displayed on the on-screen keyboard 68a, it represents "occurrence of an error" (for example, there is a fault/failure in capacitive sensing, resulting in that an untouched key generates a first key signal, or a touched key does not generate a first key signal), and a user may be reminded to take a notice. In some embodiments, the on-screen keyboard 68a has an automatically alerting mechanism. When a second key mark 74 of a key is separately displayed on the on-screen keyboard 68a, the on-screen keyboard 68a pops up an alerting box and displays error information, such as "touch control sensing error, please calibrate touch control sensing.

Because the second key mark 74 is only a flashing, and in some embodiments, only the first key mark 72 is marked on the on-screen keyboard 68a to display a finger standby position without the second key mark 74, the on-screen keyboard 68a directly omits processing of the second key signal, as shown in FIG. 18.

In some embodiments, the on-screen keyboard 68a has a setting of calibrating sensitivity of touch control sensing. The calibration method may be that the on-screen keyboard 68a is displayed on the screen 76a and a test mark is marked on a designated key to remind a user to touch a designated keycap 12a corresponding to the test mark on the physical keyboard 18. After the steps are repeated for several times, an average value of coupling capacitor is calculated, and a threshold 52 of the physical keyboard 18 is reset by using the keyboard driver 46 so as to adjust sensitivity of capacitive sensing.

Figure 21:
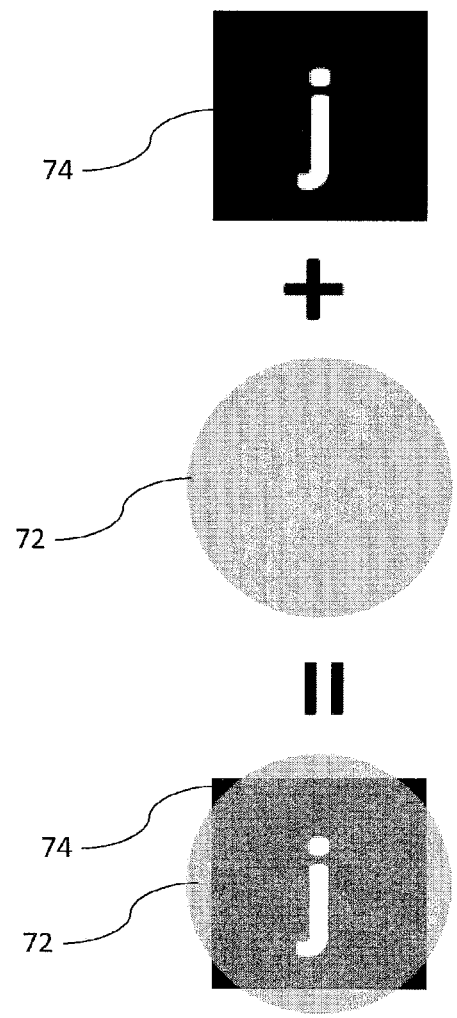
FIG. 21 is a schematic diagram (5) of the on-screen keyboard according to the first embodiment of the present invention.

FIG. 21 is an enlarged schematic diagram of the "key J" on the on-screen keyboard 68a shown in FIG. 20 and describes two marks on the "key J". The second key mark 74 in the top is marked in highlighted, and in an aspect, a square, a black background, and white words are used. The first key mark 72 in the middle is marked in a color of semi-transparency and different shapes, and in an aspect, a circle and light grey is used. A figure of overlapped marks in the bottom is an enlarged schematic diagram of the "key J" in FIG. 20. To obviously distinguish the first key mark 72 from the second key mark 74, in some embodiments, the first key mark 72 and the second key mark 74 are marked in different shapes, such as combinations of a circle and a square, a square and a triangle, and a circle and a star. In some embodiments, the first key mark 72 and the second key mark 74 are marked in different colors, such as combinations of yellow and green, red and blue, black and yellow, and light grey and red. In some embodiments, the first key mark 72 and the second key mark 74 are marked in different shapes and different colors. In some embodiments, a mark marked at an upper layer is displayed in a manner of incomplete transparency, so that a mark at a lower layer can be seen. For example, if the first key mark 72 is located at the upper layer, and the second key mark 74 is located at the lower layer, the first key mark 72 is displayed in 50% of transparency. That is, the first key mark 72 or the second key mark 74 located at the upper layer has incomplete transparency. In some embodiments, if the same keycap 12a is touched and depressed, the keycap 12a may be marked with a third key mark of shapes and colors different from those of the first key mark 72 and the second key mark 74.

Figure 22:
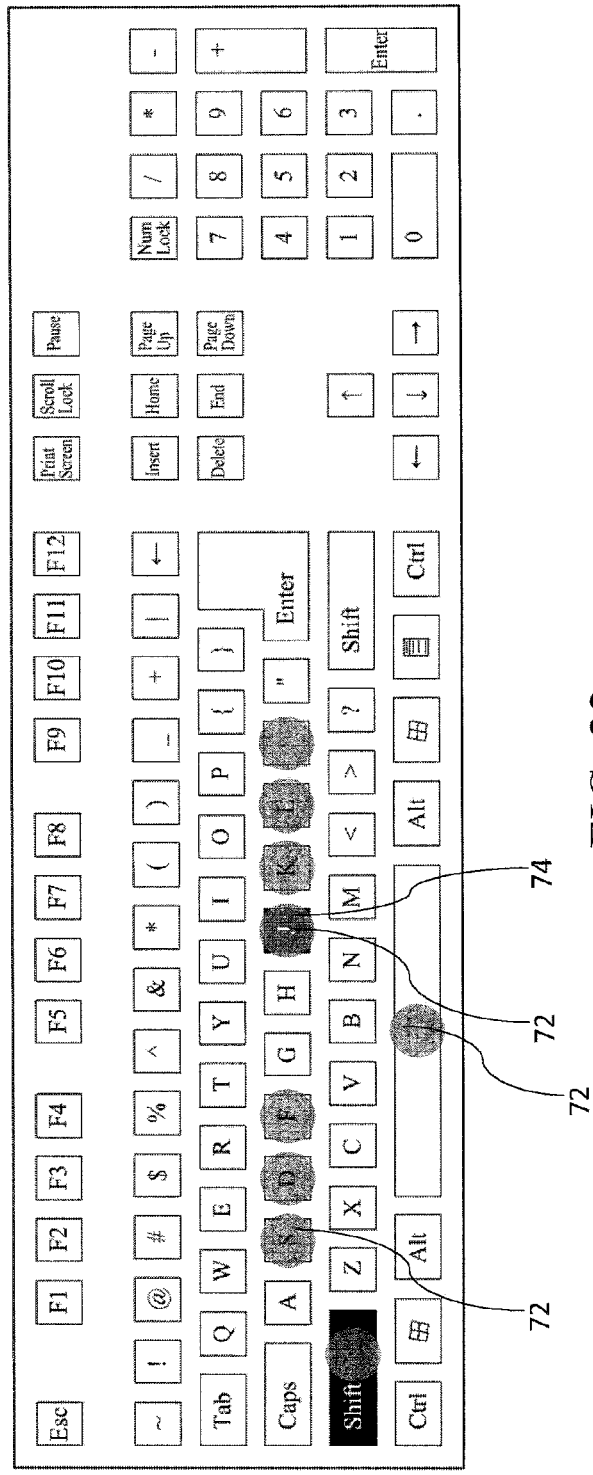
FIG. 22 is a schematic diagram (6) of the on-screen keyboard according to the first embodiment of the present invention.

FIG. 22 shows the marks displayed on the on-screen keyboard 68a when the fingers of the user are touching the keycaps 12a of the "Shift key", the "key S", the "key D", the "key F", the "key J", the "key K", the "key L", the "key ;" and the "space key" on the physical keyboard 18 (generating the first key signal) and are simultaneously depressing keycaps 12a of the "Shift key" and the "key J" (generating the second key signals which are "Make Code"). This figure describes that after a keycap 12a of the "Shift key" is depressed and the second key signal is generated, the key representation characters on the on-screen keyboard 68a also change, that is, the key representation characters change from original lowercase to uppercase, and the key which has two key representation characters (such as numeric keys and symbolic keys) change from the original lower part to the upper part. For example, the "key 1" of the numeric keys has two key representation characters which respectively are the upper part "!" and the lower part "1", and the "key !" of the symbolic keys has two key representation characters which respectively are the upper part "?" and the lower part "/". When the "Shift key" is not depressed, "1" and "/" at the lower part are displayed (shown in FIG. 18), but after the "Shift key" is depressed, "!" and "?" at the upper part are displayed (shown in FIG. 22).

Figure 23:
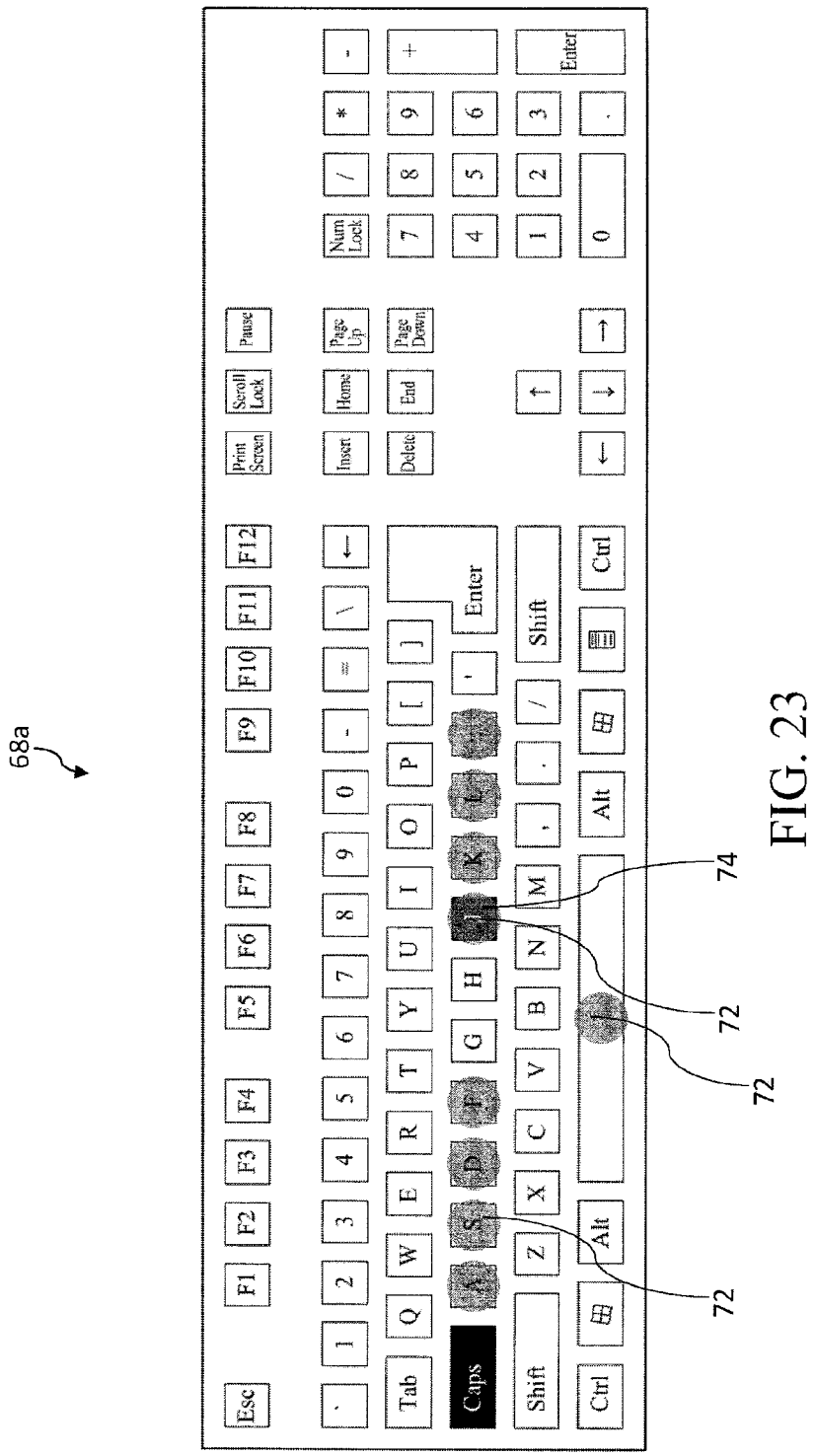
FIG. 23 is a schematic diagram (7) of the on-screen keyboard according to the first embodiment of the present invention.

FIG. 23 shows the marks displayed on the on-screen keyboard 68a when the finger of the user has depressed the keycap 12a of the caps-lock key (generating a second key signal which includes a "Make Code" and a "Break Code", that is, the keycap 12a is released), and then are touching the keycaps 12a of the "key A", the "key S", the "key D", the "key F", the "key J", the "key K", the "key L", the "key ;" and the "space key", and is depressing the keycap 12a of the "key J" (generating a second key signal which is a "Make Code"). The figure describes that after the keycap 12a of the caps-lock key generates a second key signal, the key representation characters of the letter keys on the on-screen keyboard 68a change from original lowercase letters to uppercase letters.

The two figures above describe that second key signals of the "Shift key" and the "caps-lock key" may enable the on-screen keyboard 68a to replace a part of key representation characters. Similarly, a "number-lock key" can also enable the on-screen keyboard 68a to replace a part of key representation characters. That is, the on-screen keyboard 68a not only has a function of displaying the first key mark 72 and the second key mark 74, but also includes a function of interacting with the second key signal.

Figure 24:
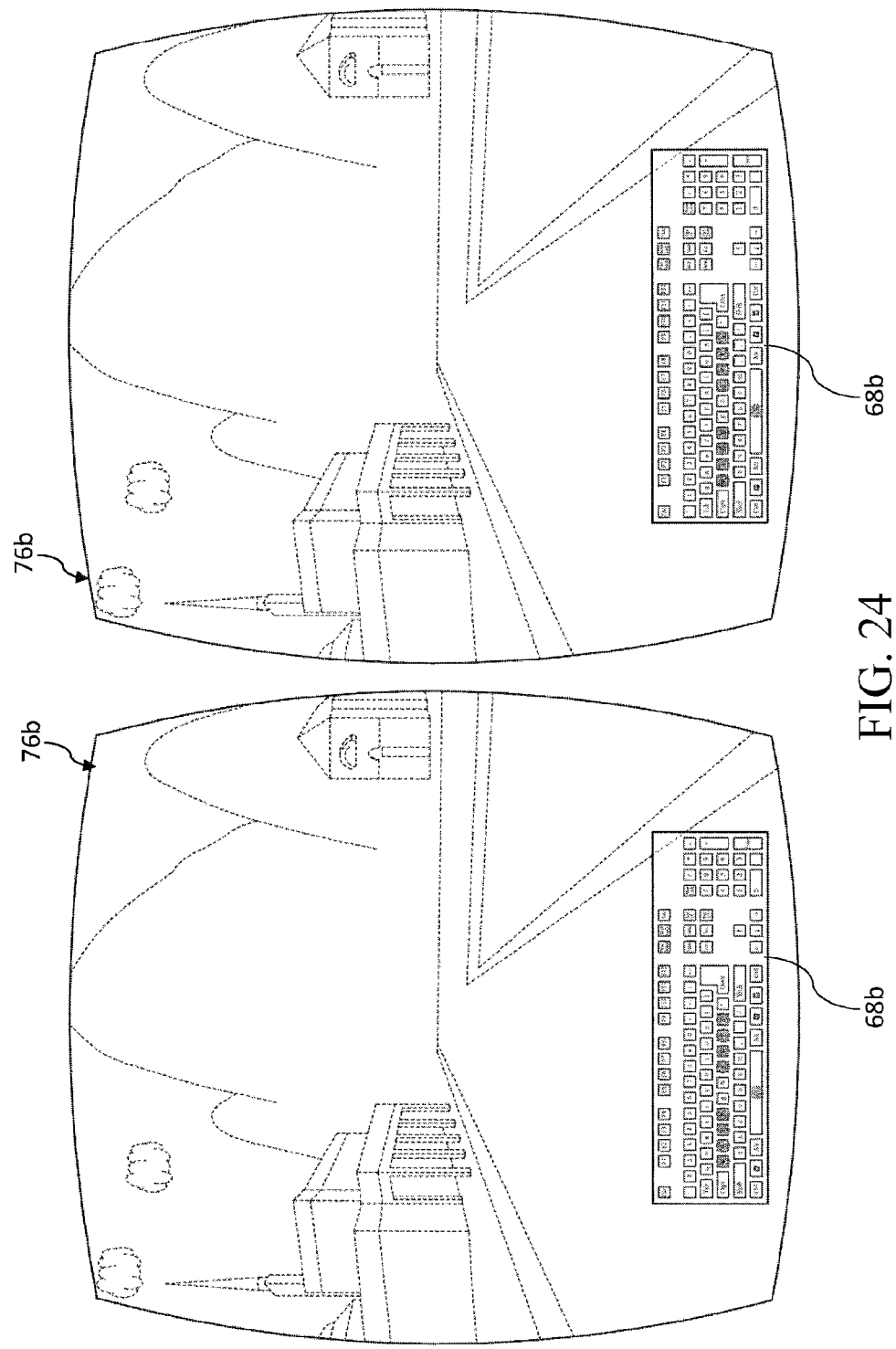
FIG. 24 is a schematic diagram (1) of an on-screen keyboard according to a second embodiment of the present invention.
Figure 25:
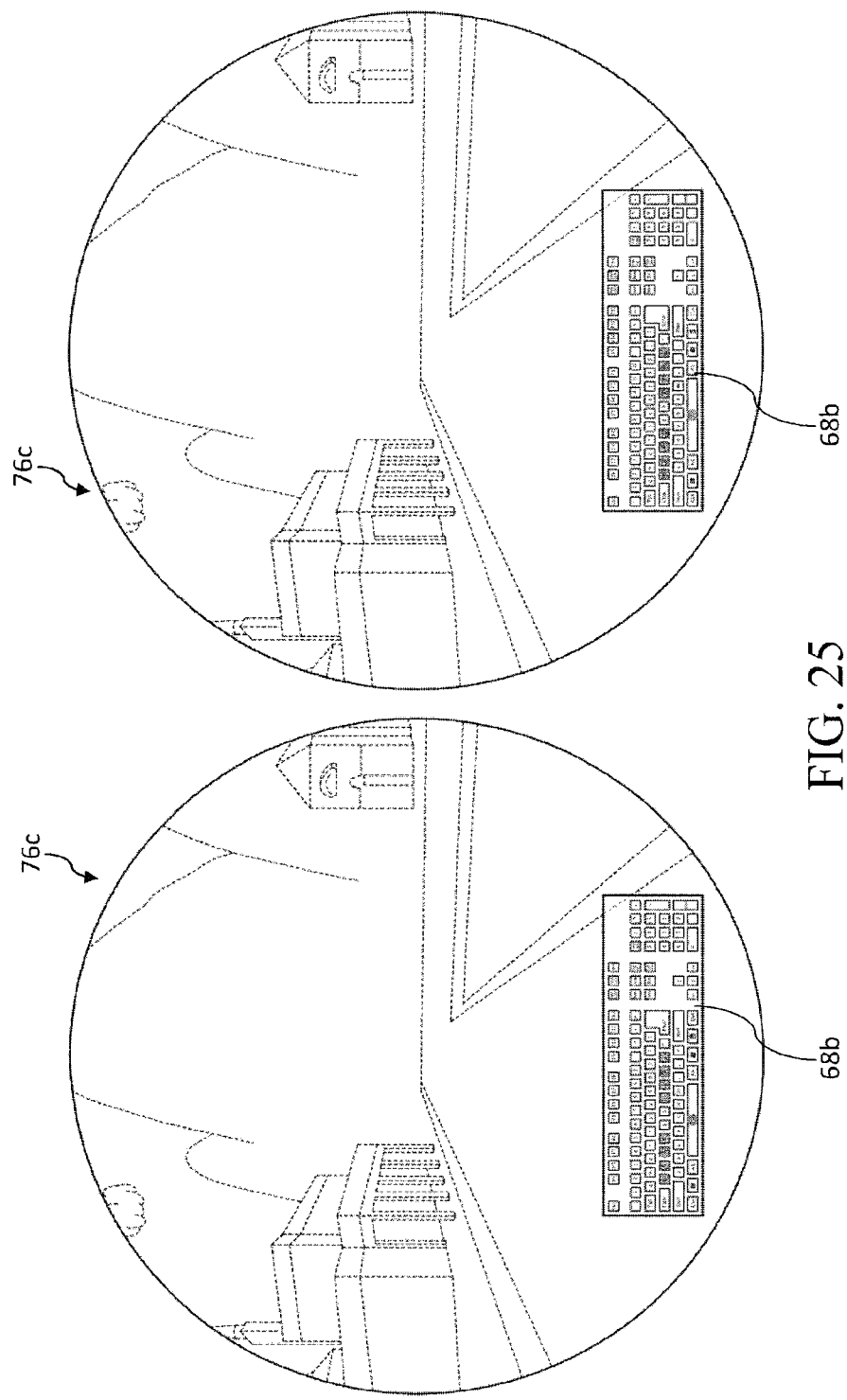
FIG. 25 is a schematic diagram (2) of the on-screen keyboard according to the second embodiment of the present invention.
Figure 26:
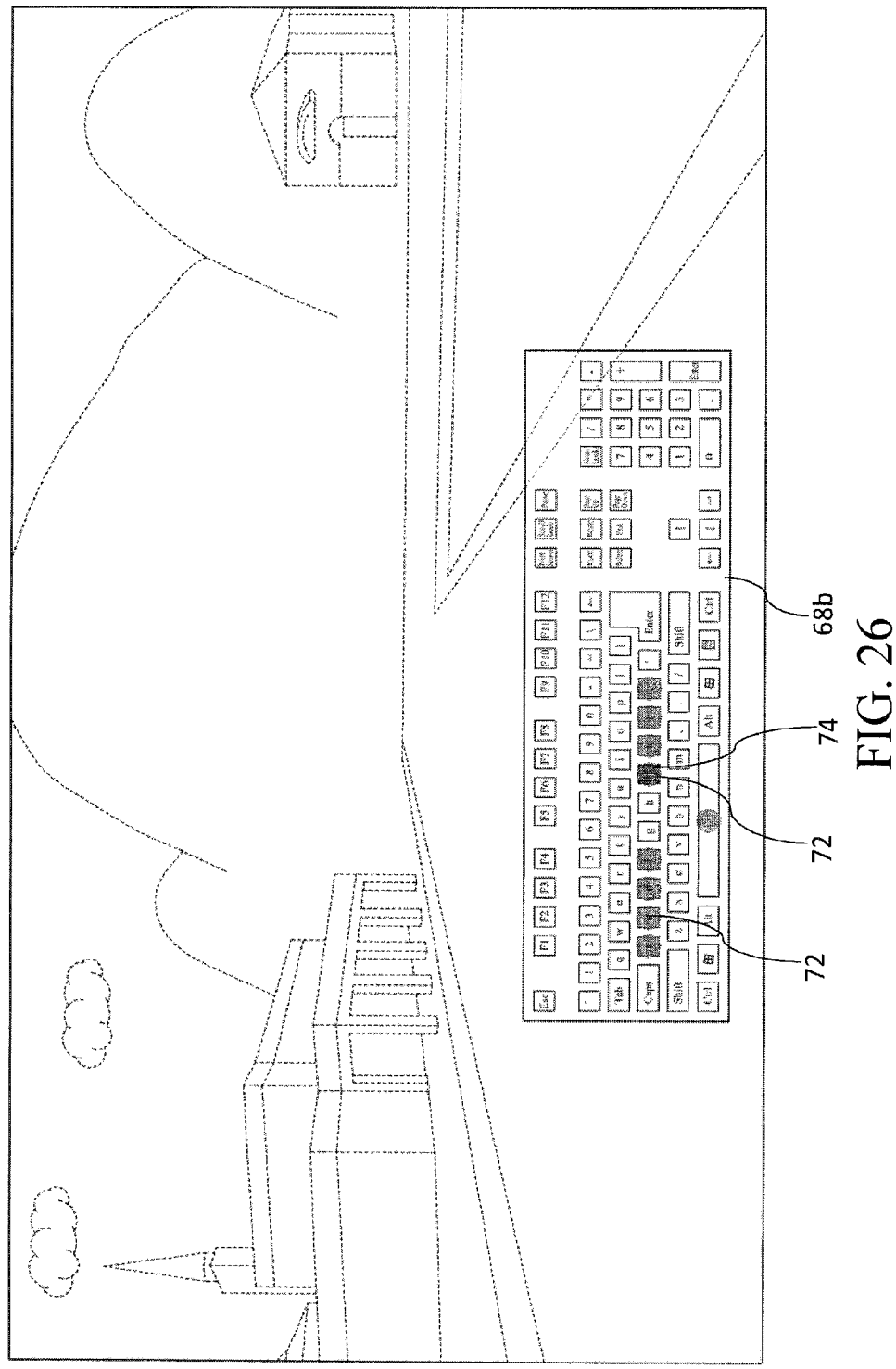
FIG. 26 is a schematic diagram (3) of the on-screen keyboard according to the second embodiment of the present invention.

Referring to FIG. 24 to FIG. 26, FIG. 24 to FIG. 26 are schematic diagrams of an on-screen keyboard 68a according to a second embodiment of the present invention. Display screens in this embodiment are screens 76b and 76c of a virtual reality display device, and the screens 76b and 76c are double-barrel-shaped (shown in FIG. 24) or double-circle-shaped (shown in FIG. 25). After a user puts the virtual reality display device on his head, his eyes see an image shown in FIG. 26. In some embodiments, the virtual reality display device is a computing device 64 having the screen 76b and 76c on itself. For example, a Gear VR of Samsung uses a smartphone as a computing device 64, and when the present invention is implemented, an on-screen keyboard 68b and a keyboard driver 46 are installed on the smartphone. In some embodiments, the virtual reality display device provides display images of the screens 76b and 76c and additionally needs to be in communication connection with a computing device 64 for installing software thereon and providing hardware computing resources. For example, HTC Vive uses a personal computer as the computing device 64, and when the present invention is implemented, an on-screen keyboard 68b and a keyboard driver 46 are installed on the personal computer. In some embodiments, a keyboard layout is displayed in an effect of non-transparency on screens 76a, 76b, and 76c. In some embodiments, a keyboard layout is displayed in an effect of incomplete transparency on screens 76a, 76b, and 76c. In some embodiments, a user may set transparency of a keyboard layout by himself/herself. Herein, the on-screen keyboard 68b displays a keyboard layout in a manner of incomplete transparency, so that when the user uses the on-screen keyboard 68b, the user still sees a background image (a virtual reality image). If the user is not adept at touch-typing, when the user cannot stare at the physical keyboard 18 (for example, the user is mounted with a virtual reality display device on his head), the user can clearly know a current finger standby position (by means of the first key mark 72), and which key is depressed (by means of the second key mark 74) by using the on-screen keyboard 68b, facilitating typing of data for the user.

Figure 27:
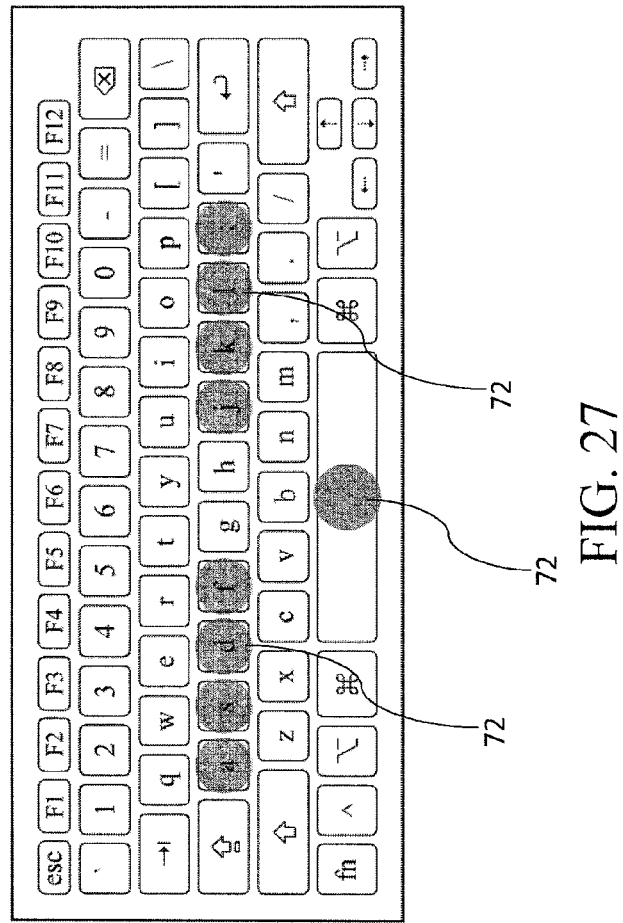
FIG. 27 is a schematic diagram of an on-screen keyboard according to a third embodiment of the present invention.

Referring to FIG. 27, FIG. 27 is a schematic diagram of an on-screen keyboard 68c according to a third embodiment of the present invention. Differences between the figure and the first embodiment and the second embodiment lie in that the figure is a keyboard layout corresponding to a physical keyboard of a Mac (not shown). Methods for displaying the first key mark 72 and the second key mark 74 and interacting with the second key signal by the on-screen keyboard 68c in this embodiment to replace a part of key representation characters are the same as those in the above-described embodiments, and details are not repeatedly described.

Figure 28:
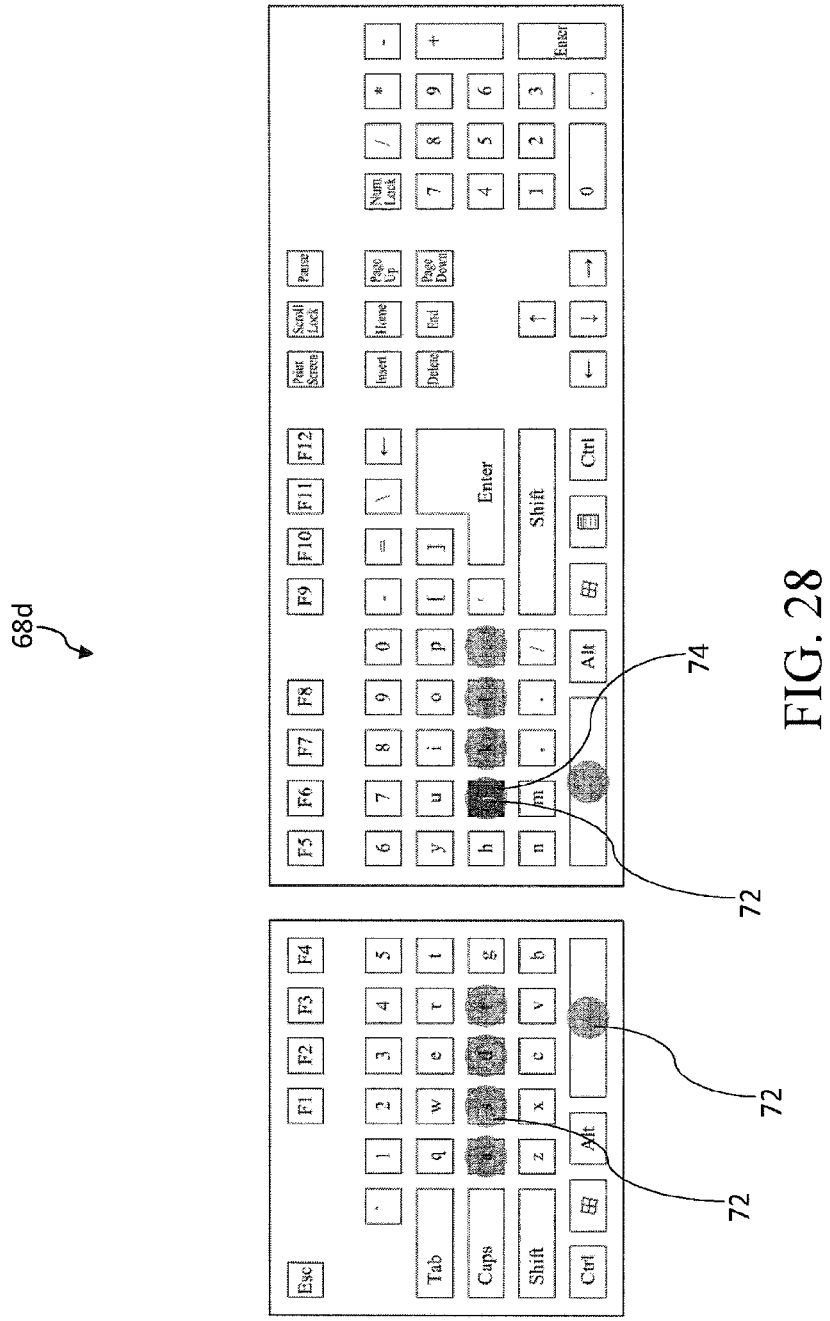
FIG. 28 is a schematic diagram of an on-screen keyboard according to a fourth embodiment of the present invention.

Referring to FIG. 28, FIG. 28 is a schematic diagram of an on-screen keyboard 68d according to a fourth embodiment of the present invention. A difference between this embodiment and the first embodiment lies in that a keyboard layout of the on-screen keyboard 68d is divided into two parts, a left part and a right part. That is, this embodiment corresponds to a physical keyboard (not shown) separated in a left and a right part. Marks of a first key mark 72 and a second key mark 74 of this embodiment are the same as those of the above-described embodiments, and details are not repeatedly described. Herein, a corresponding physical keyboard has 105 keys (that is, 104 standard keys of Windows and a duplicate space key). In some embodiments, a keyboard layout of the physical keyboard is "80% scheme" (that is, rightmost numeric keys are omitted) and has 88 keys, and a keyboard layout of the on-screen keyboard separated with the left and right part (not shown) corresponding to the physical keyboard is also "80% scheme". In some other embodiments, a keyboard layout of the physical keyboard may be a keyboard separated by a left and a right part and is "75% scheme" or "80% scheme", or may be a keyboard separated by a left and a right part of a Mac. A corresponding on-screen keyboard uses the same keyboard layout as that of the physical keyboard.

Figure 29:
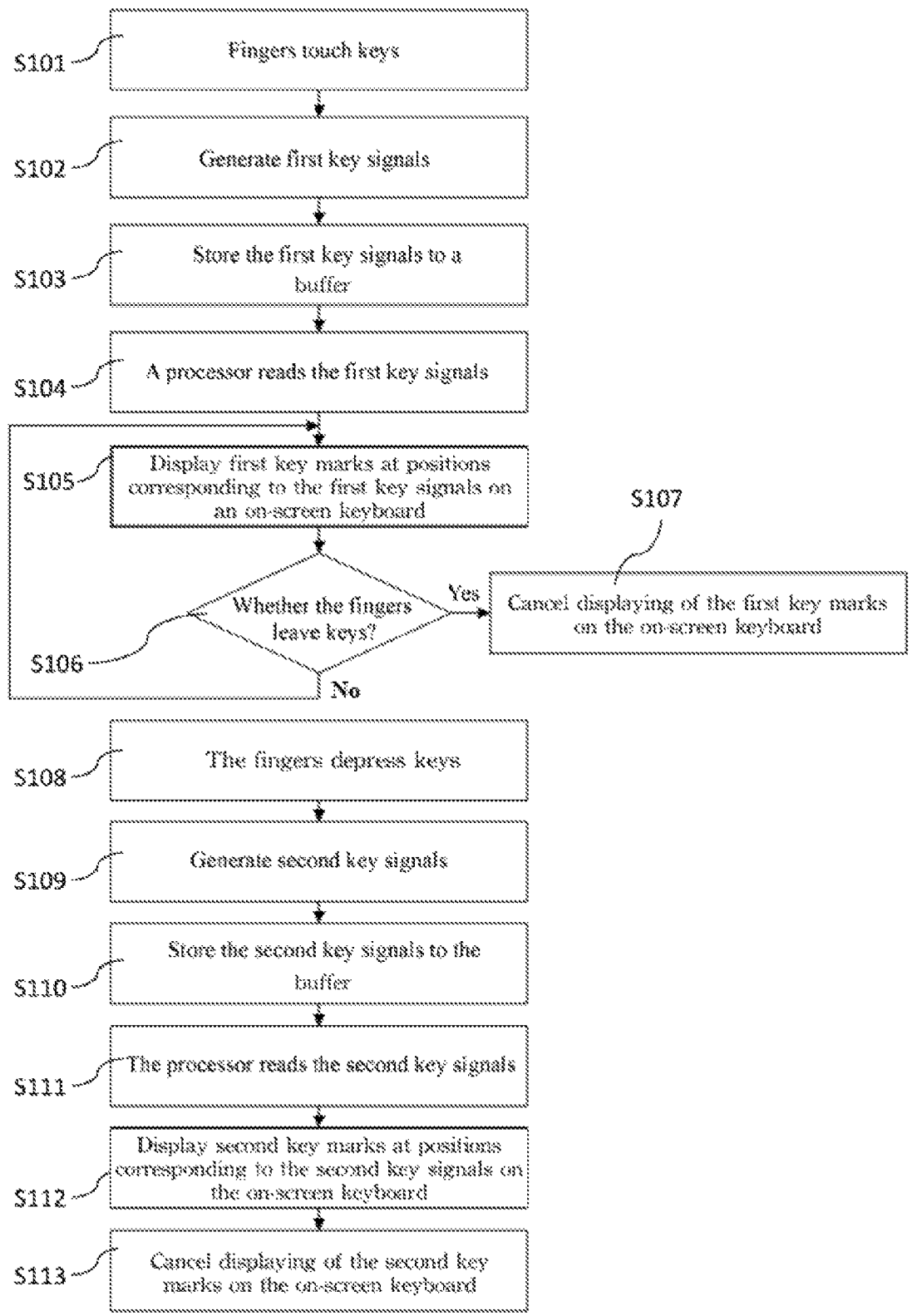
FIG. 29 is an operational flowchart of an on-screen keyboard according to an embodiment of the present invention.

Referring to FIG. 29, FIG. 29 is a flowchart of marking a first key mark 72 and a second key mark 74 on an on-screen keyboard 68a during an operating process of a user according to an embodiment of the present invention. FIG. 29 describes an operating procedure of generating a first key signal and a second key signal by a user by using a physical keyboard 18 of a computing device 64 and generating a corresponding first key mark 72 and a corresponding second key mark 74 on the on-screen keyboard 68a, and the procedure includes the following steps:

Step S101: Fingers touch keys. Fingers of a user touch keycaps 12a of the physical keyboard 18, but do not depress the keys. As shown in FIG. 19, the touched keycaps 12a are keycaps of a "key A", a "key S", a "key D", a "key F", a "key J", a "key K", a "key L", a "key ;" and a "space key". In this case, values of coupling capacitors of the touched keycaps 12a change, and a touch control determining unit 48 compares a default threshold 52 with the values of the coupling capacitors of the touched keycaps 12a to determine whether the keys are touched.

Step S102: Generate first key signals. In the previous step, after the touch control determining unit 48 determined the touched keycaps 12a, each touched keycap 12a generates a corresponding first key signal. Herein, a first key signal of the "key A", a first key signal of the "key S", a first key signal of the "key D", and so on, and a first key signal of the "space key" are generated.

Step S103: Store the first key signals to a buffer 461. In the previous step, after the touch control determining unit 48 generated the corresponding first key signals, a micro control unit 44 transmits the first key signals out so as to be received by the computing device 64. The computing device 64 stores the first key signals to a keyboard buffer 461 of the computing device 64 by using a keyboard driver 46 (that is, a part of the computer program product of the present invention). In some embodiments, the first key signal and the second key signal share the same buffer 461. In some embodiments, the buffer 461 is divided into a first buffer 462 and a second buffer 463. The first key signal is stored to its dedicated first buffer 462, and the second key signal is stored to its dedicated second buffer 463.

Step S104: A processor 66 reads the first key signals. In the previous step, after the micro control unit 44 stored the first key signals to the buffer 461 or the first buffer 462, there are two embodiments for the processor 66 to read the first key signals from the buffer 461 or the first buffer 462. In one embodiment, the micro control unit 44 sends an interrupt request to the processor 66 of the computing device 64, and then, the processor 66 of the computing device 64 responds to the interrupt request and reads the first key signals from the buffer 461 or the first buffer 462. In the other embodiment, the processor 66 of the computing device 64 automatically reads the first key signals in the buffer 461 or the first buffer 462 at set intervals in a polling manner. That is, an action of reading the first key signals is triggered in an interruption or a polling manner.

Step S105: Display first key marks 72 at positions corresponding to the first key signals on an on-screen keyboard 68a. In the previous step, after the processor 66 read the first key signals, the processor 66 displays, according to the first key signals, first key marks 72 at positions corresponding to the touched keycaps 12a on the on-screen keyboard 68a. Herein, the positions corresponding to the first key signals are the "key A", the "key S", the "key D", the "key F", the "key J", the "key K", the "key L", the "key ;" and the "space key", as shown in FIG. 18. The on-screen keyboard 68a is displayed on a topmost layer (that is, a view attribute is set as "Topmost") of a display image. In some embodiments, the on-screen keyboard 68a is displayed after the first key signal or the second key signal is read, and disappears when reaches an idle timeout. In some cases, even if the first key signal or the second key signal is not read, the on-screen keyboard 68a is still in a display state until reaches the idle timeout (if during which time the first key signal or the second key signal is not read). In some embodiments, the on-screen keyboard 68a may be displayed when an application is executed and be maintained in the display state, and disappear until a user ends the application. In some embodiments, the on-screen keyboard 68a is not promptly displayed when the application is executed, but is controlled by the user for displaying or disappearing.

Step S106: Determine whether the fingers leave keys. In an embodiment, the touch control determining unit 48 can determine whether the fingers already leave the touched keycaps 12a according to the default threshold 52. In an embodiment, the processor 66 can determine whether the fingers already leave the touched keycaps 12a according to whether the first key signals are continuously received. If the fingers leave the touched keycaps 12a, jump to step S107, and if the fingers still do not leave the touched keycaps 12a, jump to step S105.

Step S107: Cancel displaying of the first key marks 72 on the on-screen keyboard 68a. In an embodiment, when the touch control determining unit 48 determines that a finger left the touched keycap 12a, the on-screen keyboard 68a cancels displaying of a corresponding first key mark 72 (that is, corresponding to leaving of the finger from the touched keycap 12a). In an embodiment, if the computing device 64 does not receive again the first key signal corresponding to the touched keycap in a default time, displaying of the corresponding first key mark 72 is canceled. Using the above-described polling manner as an example, the processor 66 determines whether the same key signal is read every a preset time. If the same key signal is not read, it is determined that the finger left the touched keycap 12a, and displaying of the corresponding first key mark 72 is canceled.

Step S108: The fingers depress keys. When fingers depress keycaps 12a, key connection points 414 of the keycaps 12a of the depressed keys change from a normally open state to a conductive state due to keystrokes.

Step S109: Generate second key signals. When a keystroke determining unit 50 detects that a key connection point 414 of a keycap 12a changes from the normally open state to the conductive state, a second key signal (which is a second key signal of depressing the keycap 12a) is generated. Herein, for example, the "key J" is depressed. The keystroke determining unit 50 generates a second key signal (that is, a "Make Code") of the "key J".

Step S110: Store the second key signals to the buffer 461. In the previous step, after the keystroke determining unit 50 generated the second key signals (the "Make Code"), the micro control unit 44 transmits the second key signals out so as to be received by the computing device 64. The computing device 64 stores the second key signals (the "Make Code") of the "key J" to the keyboard buffer 461 of the computing device 64 or a second buffer 463 dedicated to the second key signals by using the keyboard driver 46.

Step S111: The processor 66 reads the second key signals. In the previous step, after the micro control unit 44 stored the second key signals (the "Make Code") to the buffer 461 or the second buffer 463, there are two embodiments for the processor 66 to read the second key signals from the buffer 461 or the second buffer 463. In one embodiment, the micro control unit 44 sends an interrupt request to the processor 66 of the computing device 64, and then, the processor 66 of the computing device 64 responds to the interrupt request and reads the second key signals from the buffer 461 or the second buffer 463. In the other embodiment, the processor 66 of the computing device 64 automatically reads the second key signals in the buffer 461 or the second buffer 463 at set intervals in a polling manner. That is, an action of reading the second key signals is triggered in an interruption or a polling manner.

Step S112: Display second key marks 74 at positions corresponding to the second key signals on the on-screen keyboard 68. In the previous step, after the processor 66 read the second key signals (the "Make Code"), the processor 66 displays, according to the second key signals, second key marks 74 at positions corresponding to the depressed keycaps 12*a* on the on-screen keyboard 68*a*. Herein, the positions corresponding to the second key signals are the "key J". The displayed second key marks 74 and the first key marks 72 displayed earlier are shown in FIG. 20.

Step S113: Cancel displaying of the second key marks 74 on the on-screen keyboard 68*a*. When the keystroke determining unit 50 detects that key connection points 414 of depressed keycaps 12*a* change from the conductive state to the normally open state, second key signals (which are second key signals of releasing the keycaps 12*a*) are generated. Herein, for example, the "key J" is released. The keystroke determining unit 50 generates a second key signal (that is, a "Break Code") of the "key J". After the keycap 12*a* is released, the computing device 64 stores the second key signal (the "Break Code") of the "key J" to the keyboard buffer 461 or the second buffer 463 dedicated to the second key signal by using the keyboard driver 46. Then, the processor 66 reads the second key signal (the "Break Code") of the "key J" Finally, according to the second key signal (the "Break Code") of the "key J", displaying of the corresponding second key mark 74 on the on-screen keyboard 68*a* is canceled, as shown in FIG. 18 (assuming that after a user released the "key J", a finger of the user still touches the keycap 12*a* of the "key J"). In particular, the processor 66 can additionally determine whether the depressed key is a common key such as a letter key or a numeric key, or a locking key such as the above-described "Shift key". If a second key signal corresponding to a released keycap 12*a* is received and the keycap 12*a* does not belong to the locking-key type, displaying of a corresponding second key mark is canceled. Or otherwise, if a second key signal corresponding to a released keycap 12*a* is received and the keycap 12*a* belongs to the locking-key type, displaying of the corresponding second key mark is maintained, and displaying of the second key mark 74 is canceled until a second key mark 74 corresponding to a keystroke on the keycap 12*a* is received next time.

Methods for marking the first key mark 72 and the second key mark 74 on the on-screen keyboard 68*a* of an embodiment of the present invention are described above. Further, in some embodiments of the present invention, after step S107, assuming that fingers of a user have already completely left all keycaps 12*a* for an idle time, that is, during the idle time, the processor 66 of the computing device 64 does not detect (that is, read) the first key signal and the second key signal, the on-screen keyboard 68*a* is automatically hidden (not displayed on screen 76*a*). Or otherwise, if an original on-screen keyboard 68*a* is not displayed on the screen 76*a*, after the fingers of the user touch any keycaps 12*a*, the on-screen keyboard 68*a* is automatically displayed on the screen 76*a*. Objective of this embodiment lies in that when a user does not need to operate/type data by using a keyboard, the on-screen keyboard 68*a* is hidden so as to avoid occupation of the operating system desktop 70, so that the user can operate other applications by using other manipulation apparatuses. For example, the user operates a web page browser by using a mouse or a track ball to view web page data, or plays computer games by using a joystick.

The computer program product of the present invention may include an on-screen keyboard 68*a*, a keyboard driver 46, a touch control keyboard library (not shown), and/or a touch control keyboard application programming interface (APIs, not shown). A part of or all of the operation procedures described above, may be encapsulated as the keyboard driver, the touch control keyboard library or the application programming interface, so as to be further used by other applications. The computer program product may be stored in a computer readable recording medium, such as a Hard Disk Drive, a Solid State Drive, a CD, a DVD, a USB flash disk, a memory card, or recording media of other specifications, and can be loaded and executed by a computer (that is, the computing device 64 described above).

In various embodiments of the present invention, program instructions executed by a computing device can implement every block in the flowchart, a combination of the blocks in the flowchart, or the steps in every embodiment. The program instructions are provided to a processor so as to be executed by the processor to thereby produce resources required for a machine or coordinated operation of hardware and software; hence, the instructions are executed on the processor to thereby produce elements required for carrying out actions specified by the blocks in the flowchart or technical effects. Different combinations of program instructions also allow simultaneous execution of at least some operating steps specified in the blocks in the flowchart, whereas the technical solutions indicated by the first through fourth program instructions of an application may vary from embodiment to embodiment. Furthermore, it is also practicable that some of the steps are executed on one or more processors, for example, in the case of a computing device of multiple processors or in the case of coordinated operation of a microprocessor in a mobile communication device and a peripheral interface processor. Moreover, in the flowchart, at least one block or a combination of blocks may be performed along with the other block or the other combination of blocks simultaneously or performed in a sequence different from its specified counterpart, without departing from the spirit and scope of the present invention.

Therefore, the blocks in the flowchart of the present invention support a combination of elements required for performing specified actions or technical solutions, a combination of steps required for performing specified actions or technical solutions, and program instruction elements required for performing specified actions or technical solutions. What is also understandable is that the specified actions or technical solutions are effectuated by a combination of blocks in the flowchart as well as each block in the flowchart of the present invention through the coordinated operation of a special-purpose hardware-style system or special-purpose hardware, and program instructions.

In conclusion, in addition to provide the feedback of keystrokes in real time, the on-screen keyboard of the present invention provides the feedback of a finger standby position of a user on a physical keyboard in real time as well, so that two types of information are provided simultaneously, and the user who are not adept at touch-typing does not need to stare at the physical keyboard, now can focus on the screen instead. Meanwhile, an image recognition technology is replaced with the touch sensing technology in the present invention, the problems of misjudgments of image recognition of the conventional technology are reduced, and the problem that when ambient light sources are insufficient, an image is difficult to be captured by using the conventional technology is also resolved. When applied to a head-up display device, a head-mounted display device, or a virtual reality display device, compared with a conventional real image, the on-screen keyboard of the present invention is more suitable to be integrated into a game image/a virtual reality image, and a strange feeling or unexpected to a user caused by mixing of virtual images and real images does not occur anymore. In addition, the on-screen keyboard provides two types of information of keystrokes and a finger standby position clearer than the convention real images. Moreover, when displayed on a screen, compared with the conventional real images, the on-screen keyboard uses effect processing of more appropriately incomplete transparency, so that lower overlap images (game images/virtual reality images) of the on-screen keyboard are faintly displayed, and problems that the conventional real images completely block the lower overlap screen are improved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for displaying an on-screen keyboard, applied to a computing device connected to a physical keyboard and a screen, wherein the physical keyboard comprises a plurality of keycaps, capable of responding to a touch on a keycap to output a first key signal to the computing device, the physical keyboard further responds to a keystroke on the keycap to output a second key signal to the computing device, and the method for displaying the on-screen keyboard comprises:

displaying the on-screen keyboard on a topmost layer of a display image of the screen;

reading the first key signal output by the physical keyboard corresponding to the touch on the keycap;

displaying, according to the first key signal, a first key mark at a position corresponding to a touched keycap on the on-screen keyboard;

reading the second key signal output by the physical keyboard corresponding to the depressed keycap;

displaying, according to the second key signal, a second key mark at a position corresponding to the depressed keycap on the on-screen keyboard, wherein a first shape of the first key mark is different from a second shape of the second key mark, or a first color of the first key mark is different from a second color of the second key mark, and when both of the first key mark and the second key mark corresponding to the same keycap on the on-screen keyboard are displayed, the first key mark and the second key mark are combined to form a third key mark which has a third shape different from the second shape or a third color different from the second color;

when the first key signal corresponding to the touch on the keycap is not continuously received again within a preset time, canceling displaying of the corresponding first key mark; and when the first key signal corresponding to the touch on the keycap is continuously received, keeping displaying of the corresponding first key mark; and wherein when the first key signal and the second key signal are not detected within an idle time, hiding the on-screen keyboard; and when the on-screen keyboard is hidden and the first key signal is detected, displaying the on-screen keyboard.

2. The method for displaying the on-screen keyboard according to claim 1, wherein the computing device further comprises a buffer, wherein the step of reading the first key signal output by the physical keyboard corresponding to the touch on the keycap comprises:

receiving the first key signal output by the physical keyboard;

storing a received first key signal to the buffer; and reading the received first key signal from the buffer;

and the step of reading the second key signal output by the physical keyboard corresponding to the depressed keycap comprises:

receiving the second key signal output by the physical keyboard;

storing a received second key signal to the buffer; and reading the received second key signal from the buffer.

3. The method for displaying the on-screen keyboard according to claim 2, wherein the step of reading the received first key signal from the buffer and the step of reading the received second key signal from the buffer are triggered in an interruption or a polling manner.

4. The method for displaying the on-screen keyboard according to claim 2, wherein the buffer comprises a first buffer and a second buffer, the received first key signal is stored in the first buffer, and the received second key signal is stored in the second buffer.

5. The method for displaying the on-screen keyboard according to claim 1, wherein after the step of displaying the second key mark at the position corresponding to the depressed keycap on the on-screen keyboard, the method further comprises:

identifying, according to the second key signal, whether the depressed keycap belongs to a locking-key type;

determining whether the second key signal corresponding to a released keycap is received; and when the second key signal corresponding to the released keycap is received and the keycap belongs to the locking-key type, canceling displaying of a corresponding second key mark.

6. The method for displaying the on-screen keyboard according to claim 1, wherein the first key mark or the second key mark has incomplete transparency.

7. The method for displaying the on-screen keyboard according to claim 1, wherein the on-screen keyboard has incomplete transparency.

8. The method for displaying the on-screen keyboard according to claim 1, further comprising: displaying an alerting message or an error message for a calibration when the keystroke on the keycap occurs without displaying the first key mark at a position corresponding to the keycap on the on-screen keyboard.

9. The method for displaying an on-screen keyboard according to claim 8, further comprising: displaying a test mark on the on-screen keyboard to remind a user to touch one of the plurality of keycaps corresponding to the test mark to reset or adjust a sensitivity of capacitive sensing of the physical keyboard when the keystroke on the keycap occurs without displaying the first key mark at the position corresponding to the same keycap on the on-screen keyboard.

10. A computer program product, comprising a plurality of computer executable instructions stored in a non-transitory computer readable medium, wherein the computer executable instructions are loaded and executed by a computing device connected to a physical keyboard and a screen to cause the computing device to implement a method for displaying an on-screen keyboard, the physical keyboard comprises a plurality of keycaps capable of responding to a touch on a keycap to output a first key signal to the computing device, the physical keyboard further responds to a keystroke on the keycap to output a second key signal to the computing device, the method for displaying the on-screen keyboard comprises:
  displaying the on-screen keyboard on a topmost layer of a display image of the screen;
  reading the first key signal output by the physical keyboard corresponding to the touch on the keycap;
  displaying, according to the first key signal, a first key mark at a position corresponding to a touched keycap on the on-screen keyboard;
  reading the second key signal output by the physical keyboard corresponding to a depressed keycap;
  displaying, according to the second key signal, a second key mark at a position corresponding to the depressed keycap on the on-screen keyboard, wherein a first color of the first key mark is different from a second color of the second key mark, and when both of the first key mark and the second key mark corresponding to the same keycap on the on-screen keyboard are displayed, the first key mark and the second key mark are combined to form a third key mark which has a third shape different from the second shape or a third color different from the second color;
  when the first key signal corresponding to the touch on the keycap is not continuously received again within a preset time, canceling displaying of the corresponding first key mark; and when the first key signal corresponding to the touch on the keycap is continuously received, keeping displaying of the corresponding first key mark; and
  wherein when the first key signal and the second key signal are not detected within an idle time, hiding the on-screen keyboard; and when the on-screen keyboard is hidden and the first key signal is detected, displaying the on-screen keyboard.

11. The computer program product for completing the method for displaying the on-screen keyboard according to claim 10, wherein the computing device further comprises a buffer, wherein the step of reading the first key signal output by the physical keyboard corresponding to the touch on the keycap comprises:
  receiving the first key signal output by the physical keyboard;
  storing a received first key signal to the buffer; and
  reading the received first key signal from the buffer;
  and the step of reading the second key signal output by the physical keyboard corresponding to the depressed keycap comprises:
  receiving the second key signal output by the physical keyboard;
  storing a received second key signal to the buffer; and
  reading the received second key signal from the buffer.

12. The computer program product for completing the method for displaying the on-screen keyboard according to claim 11, wherein the step of reading the received first key signal from the buffer and the step of reading the received second key signal from the buffer are triggered in an interruption or a polling manner.

13. The computer program product for completing the method for displaying the on-screen keyboard according to claim 11, wherein the buffer comprises a first buffer and a second buffer, the received first key signal is stored in the first buffer, and the received second key signal is stored in the second buffer.

14. A non-transitory computer readable medium, storing a computer program comprising a plurality of computer executable instructions that, when executed by a computing device connected to a physical keyboard and a screen, cause the computing device to implement a method for displaying an on-screen keyboard, wherein the physical keyboard comprises a plurality of keycaps capable of responding to a touch on a keycap to output a first key signal to the computing device, the physical keyboard further responds to a keystroke on the keycap to output a second key signal to the computing device, the method for displaying the on-screen keyboard comprises:
  displaying the on-screen keyboard on a topmost layer of a display image of the screen;
  reading the first key signal output by the physical keyboard corresponding to the touch on the keycap;
  displaying, according to the first key signal, a first key mark at a position corresponding to a touched keycap on the on-screen keyboard;
  reading the second key signal output by the physical keyboard corresponding to a depressed keycap;
  displaying, according to the second key signal, a second key mark at a position corresponding to the depressed keycap on the on-screen keyboard, wherein a first shape of the first key mark is different from a second shape of the second key mark, or a first color of the first key mark is different from a second color of the second key mark, and when both of the first key mark and the second key mark corresponding to the same keycap on the on-screen keyboard are displayed, the first key mark and the second key mark are combined to form a third key mark which has a third shape different from the second shape or a third color different from the second color;
  when the first key signal corresponding to the touch on the keycap is not continuously received again within a preset time, canceling displaying of the corresponding first key mark; and when the first key signal corresponding to the touch on the keycap is continuously received, keeping displaying of the corresponding first key mark; and
  wherein when the first key signal and the second key signal are not detected within an idle time, hiding the on-screen keyboard; and when the on-screen keyboard is hidden and the first key signal is detected, displaying the on-screen keyboard.

15. The non-transitory computer readable medium according to claim 14, wherein the step of reading the first key signal output by the physical keyboard corresponding to the touch on the keycap comprises:
- receiving the first key signal output by the physical keyboard;
- storing a received first key signal to the buffer; and
- reading the received first key signal from the buffer;
- and the step of reading the second key signal output by the physical keyboard corresponding to the depressed keycap comprises:
- receiving the second key signal output by the physical keyboard;
- storing a received second key signal to the buffer;
- reading the received second key signal from the buffer; and
- the step of reading the first key signal from the buffer and the step of reading the second key signal from the buffer are triggered in an interruption or a polling manner.

* * * * *